(12) United States Patent
Suzuki et al.

(10) Patent No.: US 12,337,786 B2
(45) Date of Patent: Jun. 24, 2025

(54) PASSENGER SEAT AIRBAG DEVICE

(71) Applicant: TOYODA GOSEI CO., LTD., Kiyosu (JP)

(72) Inventors: Yuya Suzuki, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/497,086

(22) Filed: Oct. 30, 2023

(65) Prior Publication Data

US 2024/0166158 A1 May 23, 2024

(30) Foreign Application Priority Data

Nov. 17, 2022 (JP) ................. 2022-184310

(51) Int. Cl.
  *B60R 21/231* (2011.01)
  *B60R 21/205* (2011.01)
(52) U.S. Cl.
  CPC .......... *B60R 21/231* (2013.01); *B60R 21/205* (2013.01); *B60R 2021/23169* (2013.01)
(58) Field of Classification Search
  CPC ..................... B60R 21/231; B60R 21/205
  See application file for complete search history.

(56) References Cited

U.S. PATENT DOCUMENTS

| | | | | |
|---|---|---|---|---|
| 2017/0210327 A1* | 7/2017 | Abe | ...................... | B60R 21/231 |
| 2020/0122678 A1* | 4/2020 | Tanaka | ................ | B60R 21/0132 |
| 2021/0061216 A1* | 3/2021 | Ito | ......................... | B60R 21/205 |
| 2022/0169199 A1* | 6/2022 | Suzuki | ................ | B60R 21/2334 |

FOREIGN PATENT DOCUMENTS

| | | | | | |
|---|---|---|---|---|---|
| JP | 2006088987 | A | * | 4/2006 | |
| JP | 2007308088 | A | * | 11/2007 | |
| JP | 2016055681 | A | * | 4/2016 | |
| JP | 2017-30631 | A | | 2/2017 | |
| JP | 6164169 | B2 | * | 7/2017 | ........... B60R 21/205 |
| JP | 6229636 | B2 | * | 11/2017 | |
| JP | 6702216 | B2 | * | 5/2020 | ........... B60R 21/231 |
| JP | 2021151807 | A | * | 9/2021 | |
| JP | 7223344 | B2 | * | 2/2023 | ........... B60R 21/205 |
| WO | WO-2016121199 | A1 | * | 8/2016 | ........... B60R 21/205 |

* cited by examiner

*Primary Examiner* — Nicole T Verley
(74) *Attorney, Agent, or Firm* — Posz Law Group, PLC

(57) ABSTRACT

A passenger seat airbag device is disposed on an upper face side of an instrument panel, and includes an airbag that can inflate owing to an inflating gas flowing into an interior. The airbag includes a conduit portion connected to an inflator on a front end side and disposed in such a way as to extend approximately following a front-rear direction, and a main body inflation portion configured in such a way as to swell up and down and from left to right from a rear end side of the conduit portion and disposed to a rear side of the instrument panel. The main body inflation portion is configured in such a way that an upper end side is supported by a front windshield disposed above the instrument panel, and a lower front face side is supported by a rear face of the instrument panel when receiving an occupant.

6 Claims, 19 Drawing Sheets

PASSENGER SEAT AIRBAG DEVICE

CROSS REFERENCE TO RELATED APPLICATIONS

The present application claims priority from Japanese Patent Application No. 2022-184310 of Suzuki et al., filed on Nov. 17, 2022, the entire disclosures of which are incorporated herein by reference.

BACKGROUND

1. Technical Field

The present disclosure relates to a so-called top-mounted type passenger seat airbag device disposed on an upper face side of an instrument panel in front of a passenger seat.

2. Description of Related Art

Normally, a top-mounted type passenger seat airbag device disposed on an upper face side of an instrument panel is of a configuration wherein an airbag housed inside a housing region inflates in such a way as to expand toward a rear while protruding upward from a protrusion aperture formed on an upper end side of the housing region. Because of this, there are cases wherein the airbag inflating in such a way as to protrude upward presses hard against a front windshield disposed above the instrument panel. In order to reduce this kind of pressing force exerted on the front windshield when the airbag initially inflates, an existing airbag includes a forward inflation portion and a rearward inflation portion, as shown in JP2017-30631A. The forward inflation portion is a region for pushing open a door portion of an airbag cover that covers the housing region from above, and the rearward inflation portion is a region that inflates in such a way as to protrude toward a vehicle rear side, thereby protecting an occupant. Further, this existing passenger seat airbag device is such that the rearward inflation portion is caused to inflate after the door portion is pushed open by the forward inflation portion, whereby the front windshield being pressed hard by the inflating airbag is restricted.

However, the existing passenger seat airbag device is of a configuration wherein a large protrusion upward of the rearward inflation portion such that the rearward inflation portion is oriented toward the front windshield is restricted simply by a protrusion of the rearward inflation portion to the vehicle rear side being encouraged by the forward inflation portion being caused to inflate before the rearward inflation portion inflates. In a state wherein inflation is completed, the forward inflation portion is depicted as being considerably inflated, integrated with the rearward inflation portion (refer to FIG. 6), but a specific external form of the forward inflation portion is not disclosed. Because of this, there is concern that depending on an external form of the instrument panel, a mounting position of the housing region, an inclination of the front windshield, and the like, the front windshield being pressed hard cannot be regulated.

SUMMARY

A passenger seat airbag device of the present disclosure is disposed on an upper face side of an instrument panel in front of a passenger seat, and includes the following:
an inflator;
an airbag that can inflate owing to an inflating gas being caused to flow into an interior, the airbag being configured such that when the airbag inflates owing to an inflating gas discharged from the inflator being caused to flow into the interior, the airbag inflates in such a way as to expand toward a rear while protruding upward from a protrusion aperture formed in the housing region; and
a housing region in which the folded airbag and the inflator are housed, wherein
the airbag includes
a conduit portion that is connected to the inflator on a front end side and is disposed in such a way as to extend approximately following a front-rear direction when inflation is completed, and
a main body inflation portion that is configured in such a way as to swell up and down and from left to right from a rear end side of the conduit portion, is disposed to a rear side of the instrument panel when inflation is completed, and can protect an occupant seated in the passenger seat, and
the main body inflation portion is configured in such a way that an upper end side when inflation is completed is supported by a front windshield disposed above the instrument panel, and a lower front face side is supported by a rear face of the instrument panel when receiving an occupant when inflation is completed.

DETAILED DESCRIPTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
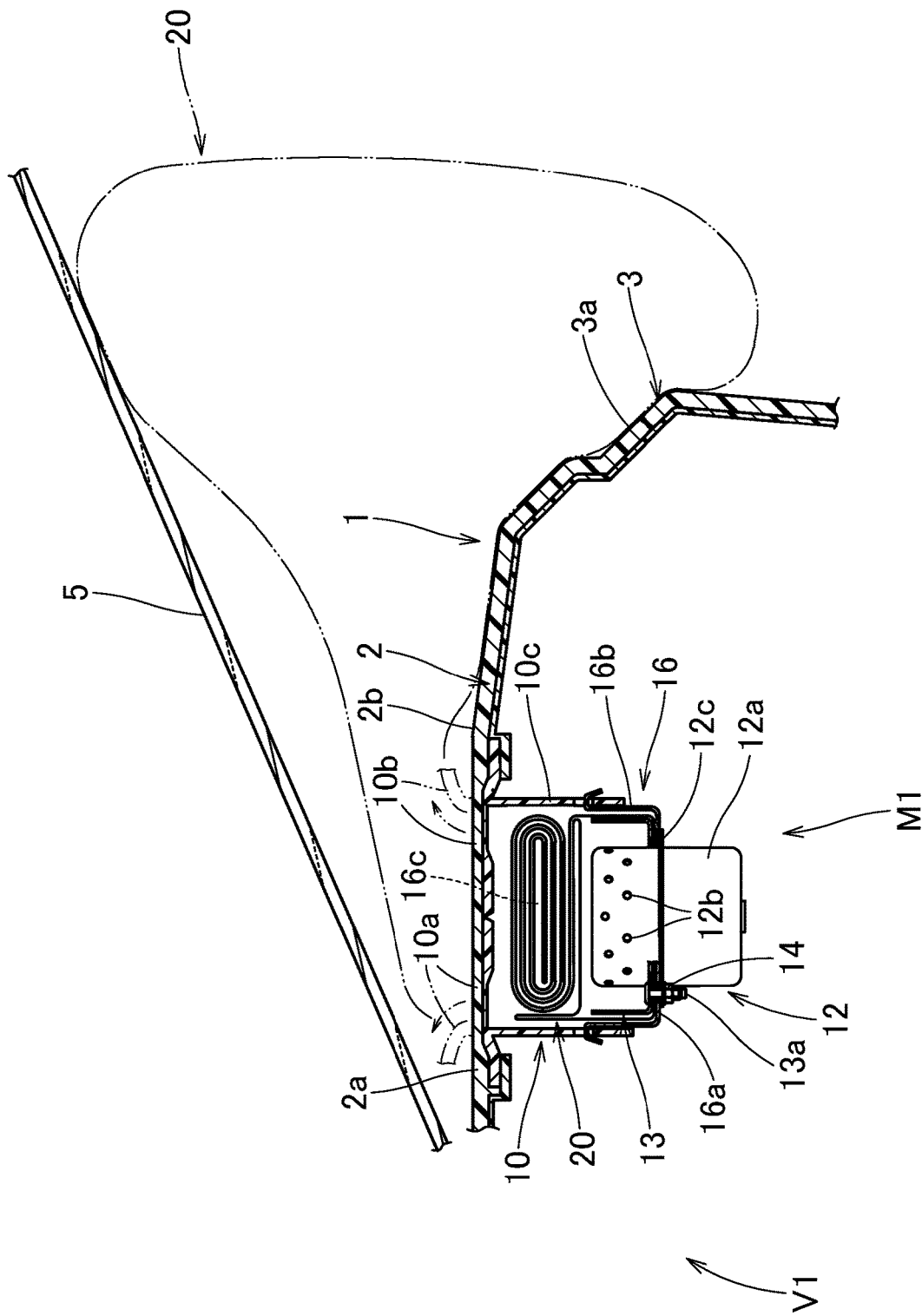
FIG. 1 is a schematic vertical sectional view of a passenger seat airbag device that is a first embodiment of the present disclosure in a state mounted in a vehicle.

Hereafter, one embodiment of the present disclosure will be described, based on the drawings. A passenger seat airbag device (hereafter abbreviated to "airbag device") M1 of a first embodiment is a top-mounted type disposed on an upper face side of an instrument panel 1, as shown in FIG. 1. Specifically, the airbag device M1 of the first embodiment is mounted in a region in a vicinity of a front end 2a on the upper face side (an upper face side region 2) of the instrument panel 1. Specifically, the instrument panel 1 of a vehicle V1 in which the airbag device M1 of the first embodiment is mounted is configured to be wide front-to-rear (to project significantly to a rear, which is an occupant MP side). The instrument panel 1 includes the upper face side region 2, which inclines slightly in such a way as to descend slightly toward the rear, and a rear face side region 3, which is disposed inclining in such a way as to extend obliquely downward from a rear end side of the upper face side region 2. Also, the vehicle V1 in which the airbag device M1 of the first embodiment is mounted is such that a front windshield 5 disposed above the instrument panel 1 is also configured in such a way that inclination with respect to a horizontal direction is comparatively small, as shown in FIG. 1. Further, the airbag device M1 is mounted in a vicinity of the front end 2a of the upper face side region 2 of the instrument panel 1. In the embodiment, front-rear, up-down, and left-right directions correspond to front-rear, up-down, and left-right directions of a vehicle, unless specifically stated otherwise.

As shown in FIG. 1, the airbag device M1 includes a folded airbag 20, an inflator 12 that supplies an inflating gas to the airbag 20, a case 16 as a housing region in which the airbag 20 and the inflator 12 are housed and held, a retainer 13 for attaching the airbag 20 and the inflator 12 to the case 16, and an airbag cover 10 that covers the folded airbag 20.

In the case of the embodiment, the airbag cover 10 is formed integrated with the instrument panel 1, which is made of a synthetic resin. Front and rear door portions 10a and 10b, which are pushed open by the airbag 20 at expanding and inflating, are disposed in the airbag cover 10. Also, a coupling wall portion 10c coupled to the case 16 is formed in a periphery of the door portions 10a and 10b in the airbag cover 10.

As shown in FIG. 1, the inflator 12 includes an approximately columnar main body portion 12a, which has a multiple of gas discharge ports 12b, and a flange portion 12c for attaching the inflator 12 to the case 16.

Figure 7:
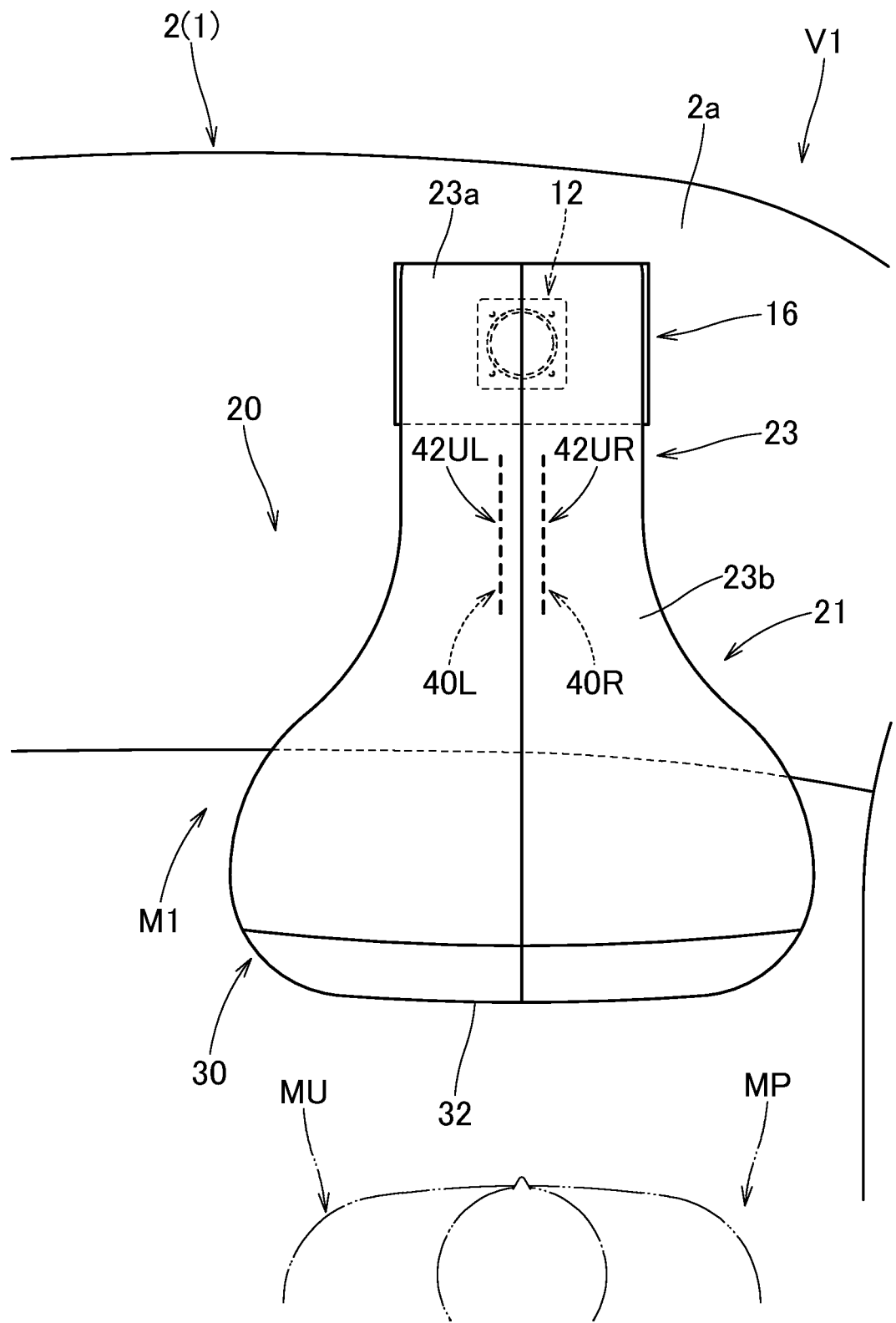
FIG. 7 is a schematic plan view showing a state wherein inflation of the airbag is completed in the passenger seat airbag device of the first embodiment.

The case 16 as a housing region is of an approximately rectangular parallelepiped form, and is made of sheet metal having an approximately rectangular protrusion aperture 16c on an upper end side. As shown in FIG. 1, the case 16 includes a bottom wall portion 16a, which is of an approximately rectangular plate form, and a peripheral wall portion 16b extending upward from an outer peripheral edge of the bottom wall portion 16a. The inflator 12 is attached to the bottom wall portion 16a by being inserted into the bottom wall portion 16a from below. The peripheral wall portion 16b is a region with which the coupling wall portion 10c of the airbag cover 10 is engaged. In the case of the embodiment, a left-right direction side of the case 16 is formed to be wide, as shown in FIG. 7. The airbag 20 and the inflator 12 are coupled to the bottom wall portion 16a of the case 16, with each bolt 13a of the retainer 13, which is disposed in an interior of the airbag 20, as attachment means. Each bolt 13a is passed through a peripheral edge of an inflow aperture 24 to be described hereafter in the airbag 20, the bottom wall portion 16a of the case 16, and the flange portion 12c of the inflator 12, and fastened with a nut 14. An unshown bracket coupled to a body side of the vehicle is disposed on the case 16.

Figure 9:
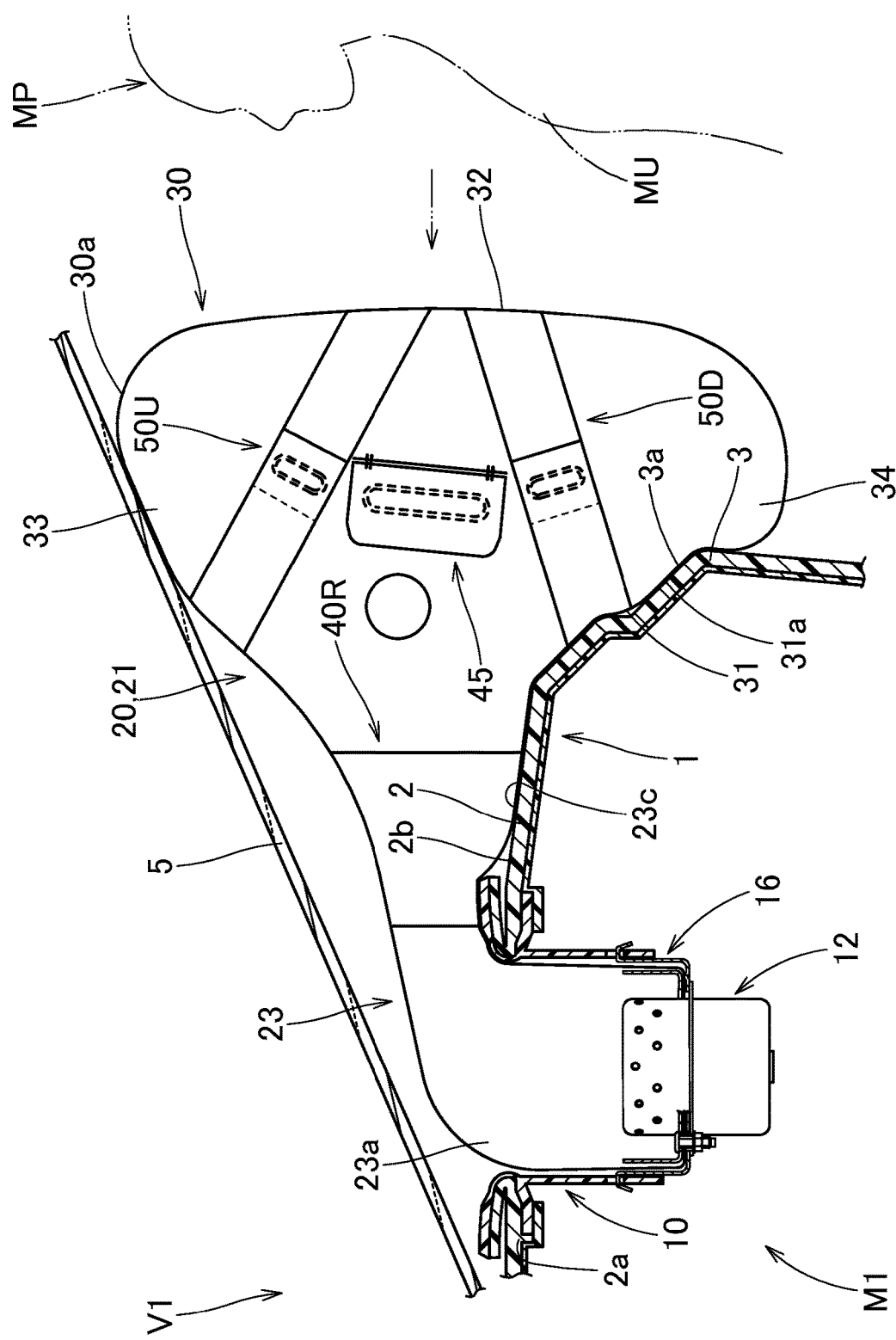
FIG. 9 is a schematic vertical sectional view showing a state wherein inflation of the airbag is completed in the passenger seat airbag device of the first embodiment.

As shown in FIG. 9, the airbag 20 is disposed between the instrument panel 1 and the front windshield 5 when inflation is completed. As shown in FIGS. 2 to 5, the airbag 20 includes a bag main body 21, and up-down tethers 40L and 40R, a left-right tether 45, and front-rear tethers 50U and 50D, which are disposed in an interior of the bag main body 21 and regulate a form of the bag main body 21 when inflation is completed. The bag main body 21 includes an approximately tubular conduit portion 23 and a main body inflation portion 30 disposed on a rear end 23b side of the conduit portion 23. A form of the airbag 20 of the embodiment when inflation is completed is a form having approximate bilateral symmetry centered on the inflow aperture 24 to be described hereafter, which is formed in the conduit portion 23.

Figure 3:
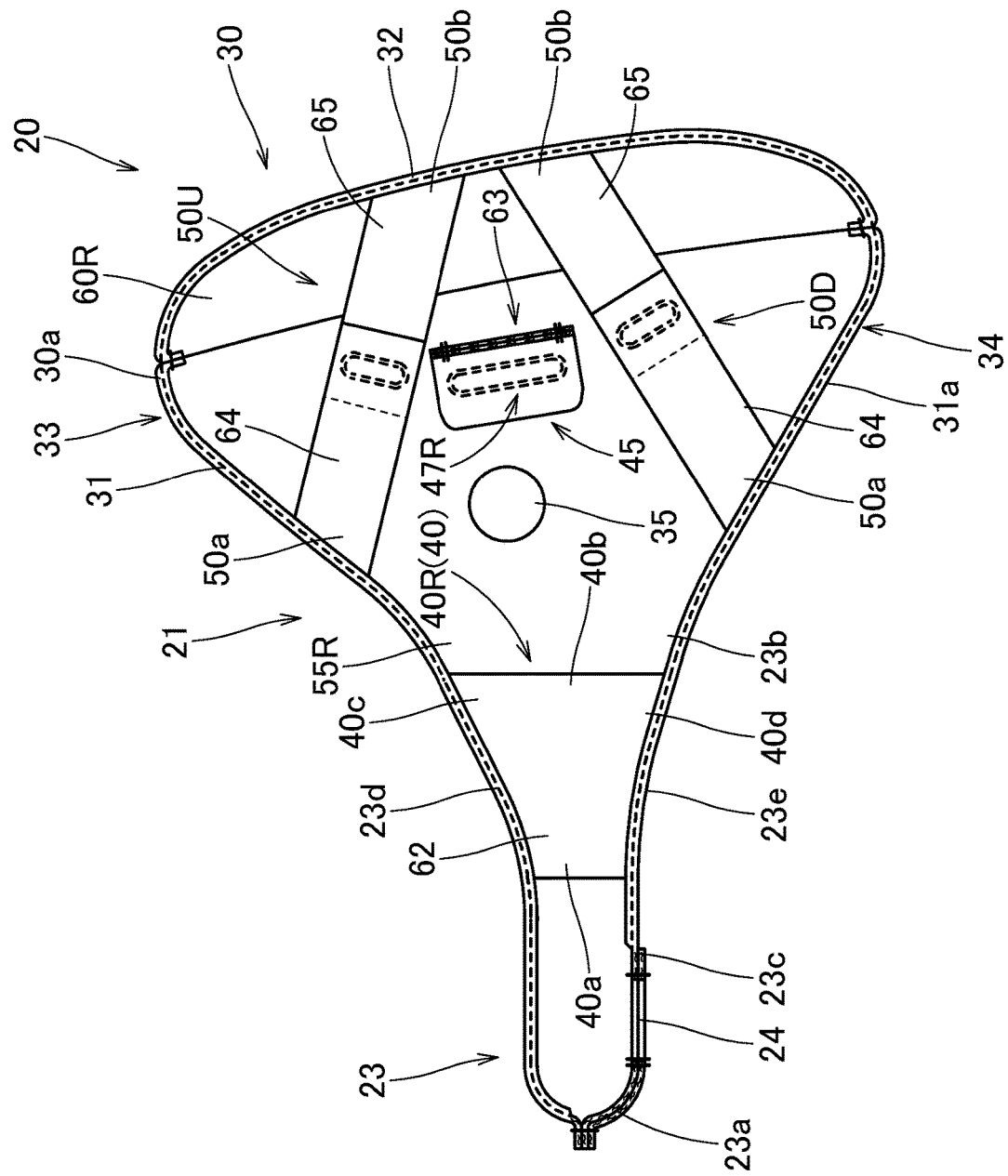
FIG. 3 is a schematic vertical sectional view approximately following a front-rear direction of the airbag of FIG. 2.
Figure 4:
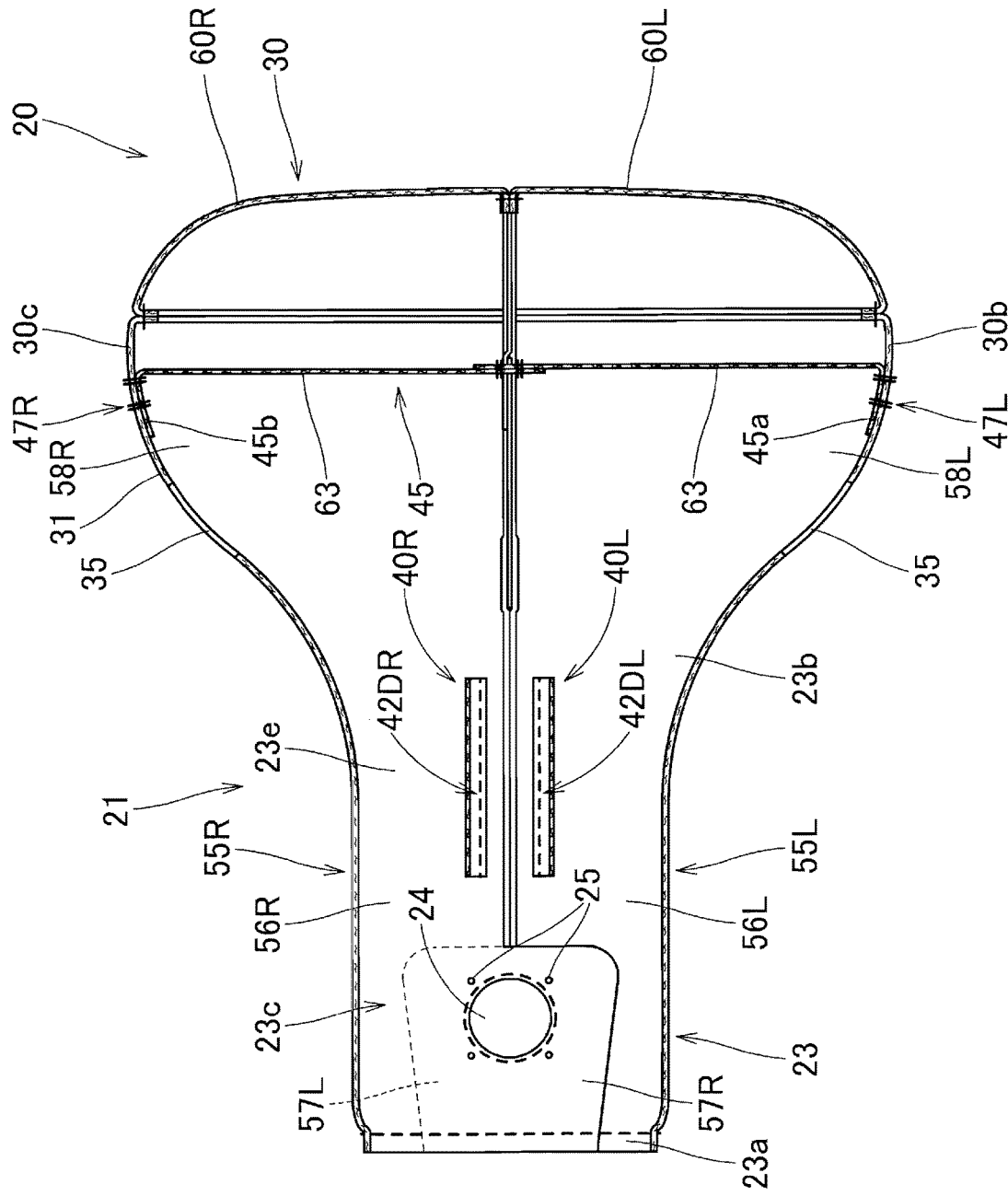
FIG. 4 is a schematic lateral sectional view approximately following the front-rear direction of the airbag of FIG. 2.

The conduit portion 23 is a region disposed in a position above the upper face side region 2 of the instrument panel 1 when inflation of the airbag 20 is completed. The conduit portion 23 is of an approximately tubular form that approximately follows the front-rear direction and whose front end 23a side is closed off. The conduit portion 23 is connected to the inflator 12 on the front end 23a side (refer to FIGS. 3, 4, and 9). As shown in FIGS. 3 and 4, the inflow aperture 24, which is for causing inflating gas to flow into the interior, is formed on a lower face side on the front end 23a side of the conduit portion 23 when inflation is completed. The inflow aperture 24 opens in an approximately circular form, and a peripheral edge is attached to the bottom wall portion 16a of the case 16. The main body portion 12a of the inflator 12 can be inserted into the inflow aperture 24. A multiple (four in the case of the embodiment) of attachment holes 25 for inserting the bolts 13a of the retainer 13 through and attaching the peripheral edge of the inflow aperture 24 to the bottom wall portion 16a of the case 16 are formed in the peripheral edge of the inflow aperture 24. A width dimension between left-right direction sides of the conduit portion 23 is set to be smaller than the main body inflation portion 30. Also, a width dimension between up-down direction sides (a thickness when inflation is completed) of the conduit portion 23 is also set to be smaller than the main body inflation portion 30 (refer to FIGS. 3 and 4). Specifically, the conduit portion 23 is configured in such a way that a width dimension between left-right direction sides of a region on the front end 23a side approximately coincides with a width dimension between left-right direction sides of the case 16, and becomes slightly wider toward the rear end 23b side, which forms the main body inflation portion 30 side (refer to FIG. 7). The conduit portion 23 is disposed in such a way as to cover an upper face of the upper face side region 2 of the instrument panel 1 when inflation of the bag main body 21 is completed when mounted in a vehicle, in a state of non-contact with the front windshield 5 (in a state such that a gap is provided between the front windshield 5 and the conduit portion 23). More specifically, the conduit portion 23 is disposed in such a way as to approximately follow an upper face 2b of the upper face side region 2 (in such a way as to be in contact with the upper face 2b of the upper face side region 2 over approximately a whole face on a lower face 23c side) when inflation of the bag main body 21 is completed (refer to FIG. 9).

Figure 2:
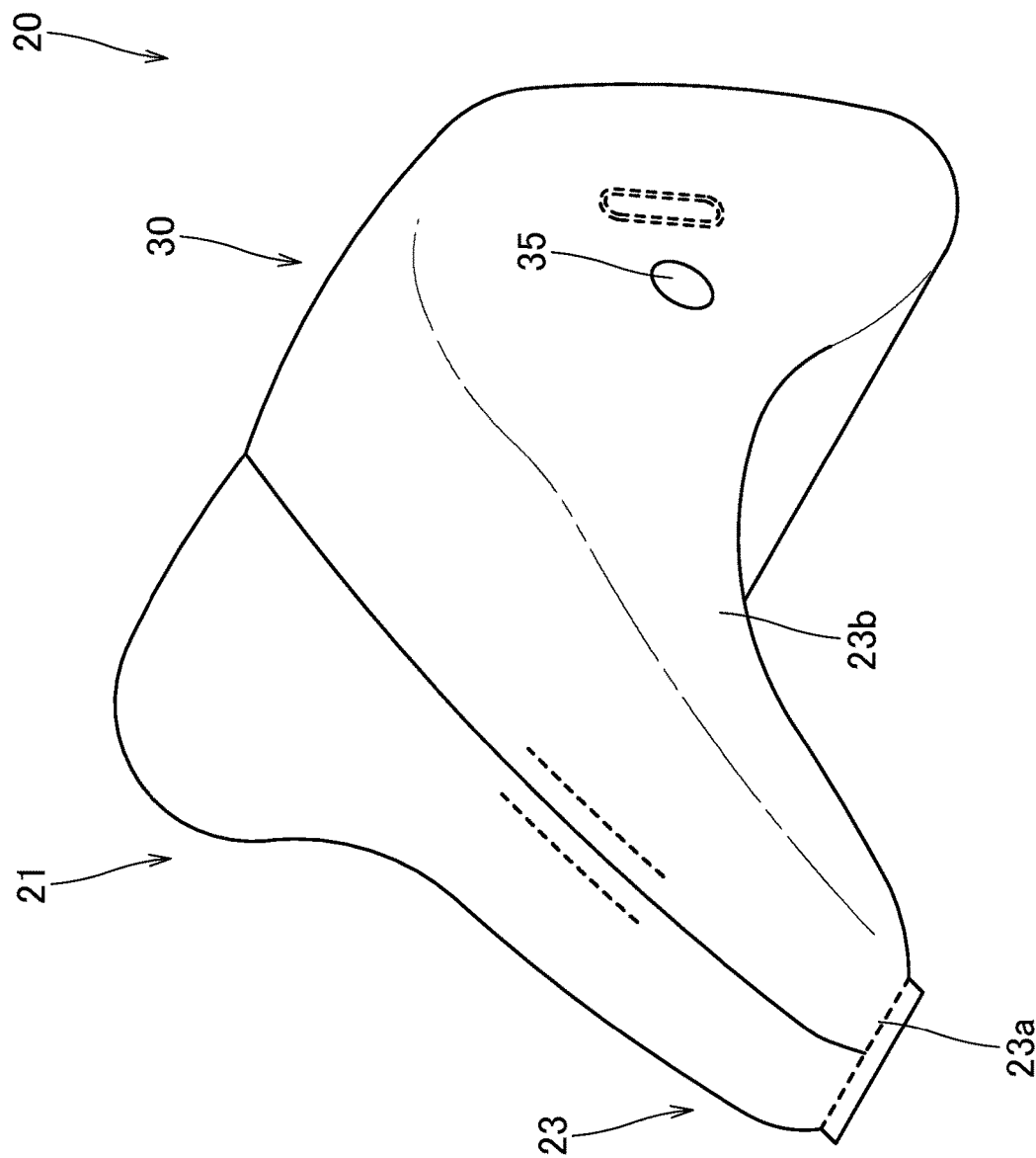
FIG. 2 is a schematic perspective view showing a state wherein an airbag used in the passenger seat airbag device of the first embodiment is individually inflated.
Figure 8:
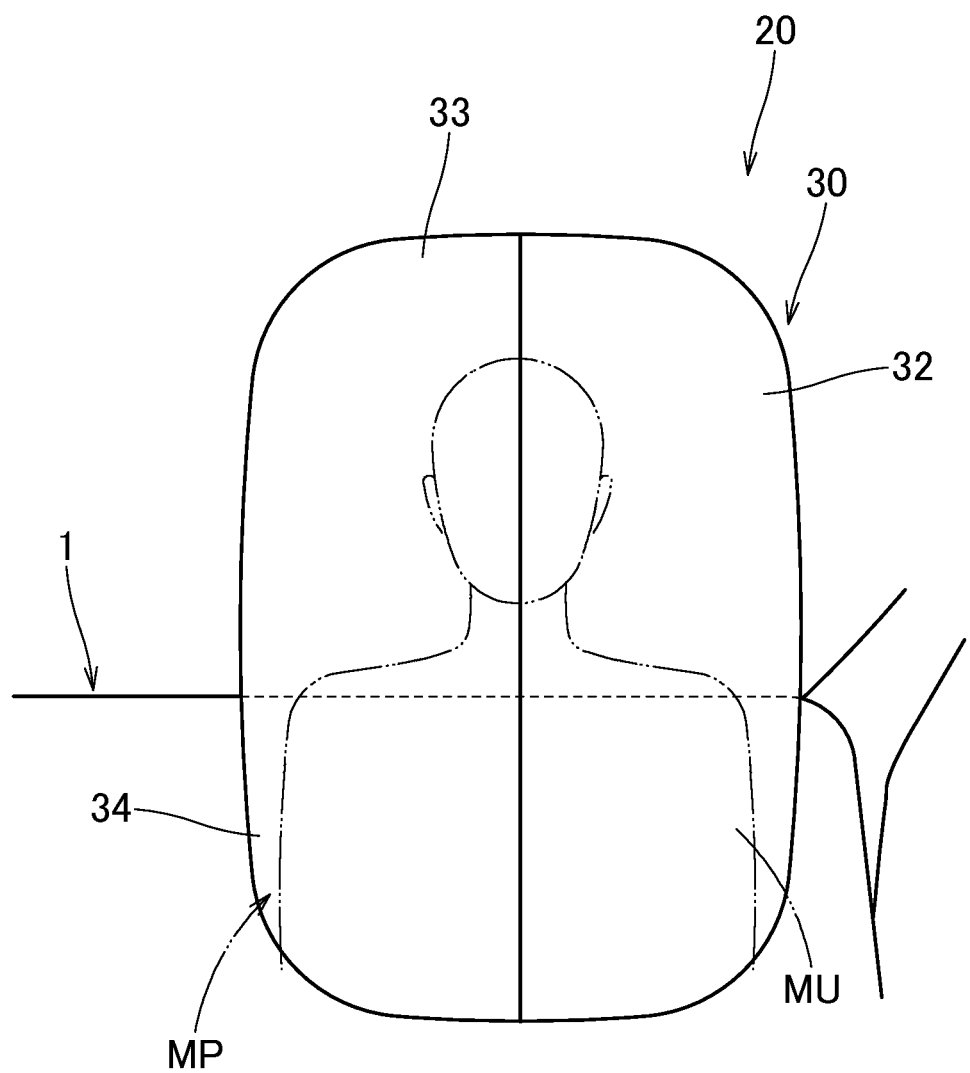
FIG. 8 is a schematic rear view showing a state wherein inflation of the airbag is completed in the passenger seat airbag device of the first embodiment is seen from a vehicle rear side.

As shown in FIGS. 2 to 4, the main body inflation portion 30 is of a configuration such as to swell up and down and to the left and right from the rear end 23b side of the conduit portion 23. The main body inflation portion 30 is disposed in a position on a rear side of the instrument panel 1 when inflation of the bag main body 21 is completed when mounted in a vehicle, and is configured in such a way as to be able to protect mainly an upper body MU of the occupant MP seated in the passenger seat (refer to FIGS. 8 and 9). Specifically, the airbag 20 of the embodiment is such that the main body inflation portion 30 is a region disposed in a position farther to the rear than the upper face side region 2 of the instrument panel 1 (on a rear side of the rear face side region 3) when inflation is completed when mounted in a vehicle. The main body inflation portion 30 has a front wall portion 31, which spreads up and down and to the left and right in such a way as to extend from the conduit portion 23, and a rear wall portion 32 disposed on a rear face side when inflation is completed. A form of the main body inflation portion 30 when inflation is completed is an approximately rectangular plate form that is slightly wider up and down. The rear wall portion 32 is disposed approximately following a vertical direction in such a way as to oppose the upper body MU of the occupant MP seated in the passenger seat when inflation of the airbag 20 is completed. Also, a width dimension between up-down direction sides of the main body inflation portion 30 (an amount of protrusion upward from the conduit portion 23 and an amount of protrusion downward from the conduit portion 23) is set in such a way as to satisfy the following configuration. When inflation of the airbag 20 is completed, an upper end 30a side of the main body inflation portion 30 is supported by the front windshield 5. Also, at this time, a lower side of the main body inflation portion 30 is positioned to the rear of the rear face side region 3 of the instrument panel 1, and when receiving an occupant when inflation is completed, a lower front face side (a lower portion 31a side of the front wall portion 31) is supported by a rear face 3a of the rear face side region 3. The embodiment is such that when inflation of the airbag 20 is completed, the lower portion 31a side of the front wall portion 31 of the main body inflation portion 30 is configured in such a way as to approximately follow the rear face 3a of the rear face side region 3 of the instrument panel 1, and come into contact with the rear face 3a. Also, a width dimension between left-right direction sides of the main body inflation portion 30 when inflation is completed is set to be greater than a width dimension between left-right direction sides of the conduit portion 23. When inflation of the airbag 20 is completed, the main body inflation portion 30 extensively covers a space in front of the upper body MU of the occupant MP seated in the passenger seat (refer to FIG. 8). Specifically, a form of the main body inflation portion 30 when inflation is completed is configured in such a way as to be wider left-to-right than the upper body MU of the occupant MP. To describe in further detail, a region (an upper side supported region 33) on the upper end 30a side of the main body inflation portion 30 is supported by coming into contact with the front windshield 5 over approximately a whole left-right region when inflation of the bag main body 21 is completed. The lower front face side (the lower portion 31a of the front wall portion 31) of the main body inflation portion 30 is supported by coming into contact with the rear face 3a of the rear face side region 3 of the instrument panel 1 over approximately a whole left-right region. The upper side supported region 33 in contact with and supported by the front windshield 5 is such that an amount in contact with the front windshield 5 (a contact area) is set in such a way as to satisfy the following configuration. Even when receiving the upper body MU of the occupant MP who moves forward, the upper side supported region 33 can maintain a state of being in contact with the front windshield 5. Also, a thickness dimension of the main body inflation portion 30 when inflation is completed is set in such a way as to satisfy the following configuration. When a region in which the front face side (the lower portion 31a side of the front wall portion 31) is supported by the rear face side region 3 of the instrument panel 1 in the main body inflation portion 30 (a lower side supported region 34) receives the upper body MU of the occupant MP who moves forward, bottoming on the rear face side region 3 is restricted, and the occupant MP can be appropriately protected by the main body inflation portion 30. Ventholes 35 and 35 for discharging excess inflating gas that has flowed into the airbag 20 are opened in an approximately circular form in the main body inflation portion 30. The ventholes 35 and 35 are formed in a region in a vicinity of the rear side of the conduit portion 23 on both left and right edge sides of the front wall portion 31.

Figure 5:
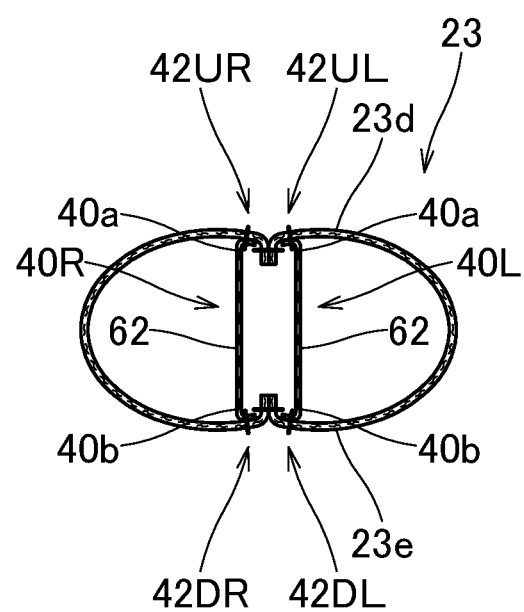
FIG. 5 is a schematic vertical sectional view of a disposition of an up-down tether in a conduit portion of the airbag of FIG. 2.
Figure 6:
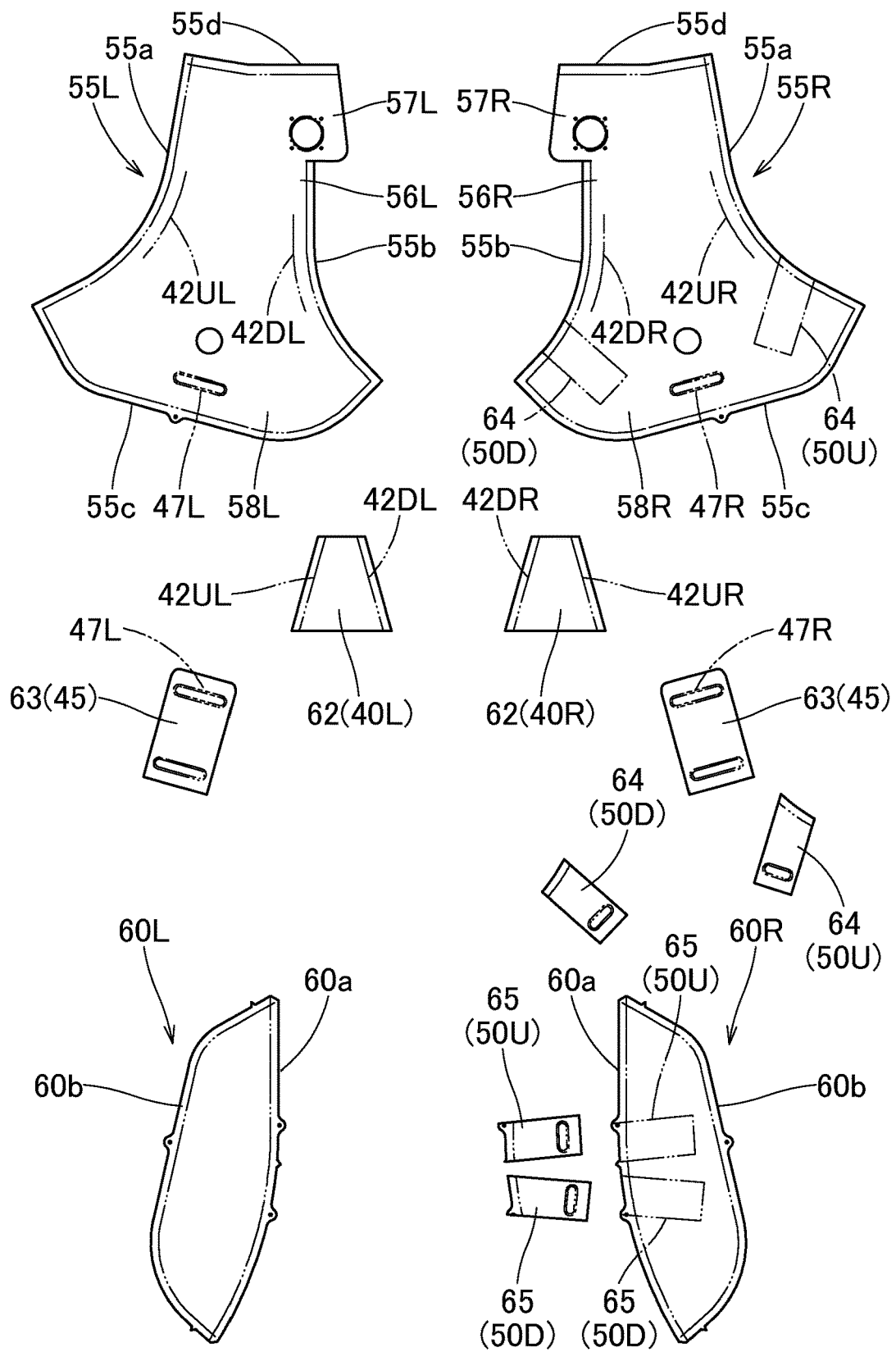
FIG. 6 is a plan view of a state wherein panels configuring the airbag of FIG. 2 are arrayed.

The up-down tethers 40L and 40R are disposed inside a region of the conduit portion 23. The up-down tethers 40L and 40R are for regulating the thickness (the width dimension between the up-down direction sides) of the conduit portion 23 when inflation of the bag main body 21 is completed. As shown in FIGS. 3 to 5, the two up-down tethers 40L and 40R are disposed in parallel on left-right direction sides in a region that is approximately a rear half of the conduit portion 23 farther to the rear than the inflow aperture 24 (specifically, a region disposed to the rear of the case 16 when mounted in a vehicle, refer to FIG. 9), and is a region in a vicinity of a left-right center. As shown in FIG. 6, each of the up-down tethers 40L and 40R is configured of an approximately trapezoidal tether base member 62. Each of the up-down tethers 40L and 40R is disposed in such a way that an end portion of a narrow side of the tether base member 62 is positioned on a front side, and with a front end 40a side being narrow, is expanded toward a rear end 40b side (refer to FIG. 3). Also, an upper edge 40c side and a lower edge 40d side of each of the up-down tethers 40L and 40R are joined (sewn) to an upper side region 23d and a lower side region 23e respectively of the conduit portion 23 over approximately a whole length in such a way as to form sewn regions 42UL, 42DL, 42UR, and 42DR. Further, the up-down tethers 40L and 40R are disposed in such a way as to approximately follow the front-rear direction when inflation of the airbag 20 is completed (refer to FIGS. 4 and 5). Specifically, the up-down tethers 40L and 40R are disposed in a region wherein an upper edge and a lower edge are curved in such a way as to be expanded toward the rear side in front side regions 56L and 56R of a front left panel 55L and a front right panel 55R, to be described hereafter, configuring the bag main body 21 (refer to FIG. 6). In other words, the up-down tethers 40L and 40R are disposed in a region to the rear of protruding portions 57L and 57R.

The left-right tether 45 is disposed inside a region of the main body inflation portion 30. The left-right tether 45 is for regulating a width between left-right direction sides of the main body inflation portion 30 when inflation of the bag main body 21 is completed. As shown in FIGS. 3 and 4, the left-right tether 45 is disposed in such a way as to couple a left edge 30b side and a right edge 30c side in an approximate up-down center of the main body inflation portion 30 when inflation is completed. The left-right tether 45 is disposed in such a way as to approximately follow the left-right direction while a width direction is approximately aligned with the up-down direction. In the case of the embodiment, the left-right tether 45 is configured by joining two strip form tether base members 63 and 63 linearly. Specifically, the left-right tether 45 is such that a left end 45a side and a right end 45b side are sewn (joined) to the main body inflation portion 30 in such a way as to provide sewn regions 47L and 47R in a position in a vicinity of a rear edge 55c of the front left panel 55L and the front right panel 55R configuring the bag main body 21 (refer to FIGS. 4 and 6).

The front-rear tethers 50U and 50D are disposed inside a region of the main body inflation portion 30 when inflation of the bag main body 21 is completed. The front-rear tethers 50U and 50D are disposed approximately following the front-rear direction in such a way as to couple the front wall portion 31 and the rear wall portion 32 of the main body inflation portion 30. The front-rear tethers 50U and 50D are for regulating a distance between the front wall portion 31 and the rear wall portion 32 of the main body inflation portion 30 (the thickness of the main body inflation portion 30) when inflation of the bag main body 21 is completed. Further, the front-rear tethers 50U and 50D are disposed in order to stabilize the form of the main body inflation portion 30 when inflation is completed as an approximately rectangular plate form in combination with the left-right tether 45. Specifically, the front-rear tethers 50U and 50D are arranged in two places up and down in an approximate left-right center of the main body inflation portion 30 when inflation is completed. The front-rear tethers 50U and 50D are disposed with a width direction approximately following the up-down direction. Also, the front-rear tethers 50U and 50D are disposed inclined in such a way as to approach each other toward a rear end 50b side (the rear wall portion 32 side) in a state wherein the bag main body 21 when inflation is completed is seen from a left-right direction side (refer to FIG. 3). In further detail, the front-rear tethers 50U and 50D are such that length dimensions are set to be approximately the same. A front end 50a side of each of the front-rear tethers 50U and 50D is disposed in a vicinity of a boundary region between the conduit portion 23 and the front wall portion 31 of the main body inflation portion 30. Rear end 50b sides of the front-rear tethers 50U and 50D are in proximity up and down in approximate up-down and left-right centers of the rear wall portion 32 of the main body inflation portion 30. Specifically, each of the front-rear tethers 50U and 50D is configured by joining two strip form tether base members 64 and 65 linearly. The front end 50a side of each of the front-rear tethers 50U and 50D is sewn together with upper edges 55a and 55a or lower edges 55b and 55b of the front left panel 55L and the front right panel 55R. The rear end 50b side of each of the front-rear tethers 50U and 50D is sewn to inner edges 60a and 60a of a rear left panel 60L and a rear right panel 60R, to be described hereafter, configuring the bag main body 21 (refer to FIGS. 3, 4, and 6).

The bag main body 21 is configured in a bag form by peripheral edges of base members (base fabric) of predetermined forms being joined together. In the case of the embodiment, the bag main body 21 is configured of the front left panel 55L, the front right panel 55R, the rear left panel 60L, and the rear right panel 60R, as shown in FIG. 6.

The front left panel 55L and the front right panel 55R configure a region from the conduit portion 23 to the front wall portion 31 of the main body inflation portion 30. As shown in FIG. 6, an external form of each of the front left panel 55L and the front right panel 55R is a form having approximate bilateral symmetry. Each of the front left panel 55L and the front right panel 55R includes the front side regions 56L and 56R, which configure the conduit portion 23, and rear side regions 58L and 58R, which configure the front wall portion 31 of the main body inflation portion 30. The protruding portions 57L and 57R, which configure a region on a peripheral edge of the inflow aperture 24, are formed in such a way as to protrude downward on a front lower end side of the front side regions 56L and 56R respectively. An upper edge and a lower edge of each of the front side regions 56L and 56R are curved. Further, a region to the rear side of each of the front side regions 56L and 56R (specifically, a region farther to the rear than the protruding portions 57L and 57R) is slightly expanded toward the rear side (the rear side regions 58L and 58R side). The rear side regions 58L and 58R are caused to curve, causing an upper edge side and a lower edge side to be further distanced from each other, in such a way that the rear side regions 58L and 58R extend from the front side regions 56L and 56R. The rear side regions 58L and 58R are configured to be wide in up-down direction.

The rear left panel 60L and the rear right panel 60R configure the rear wall portion 32 of the main body inflation portion 30. As shown in FIG. 6, an external form of each of the rear left panel 60L and the rear right panel 60R is a form having approximate bilateral symmetry. A curved form of an outer edge 60b of each of the rear left panel 60L and the rear right panel 60R approximately coincides with a curved form of the rear edge 55c of each of the front left panel 55L and the front right panel 55R.

In the embodiment, each of the front left panel 55L, the front right panel 55R, the rear left panel 60L, and the rear right panel 60R configuring the bag main body 21, and the tether base members 62, 63, 64, and 65 configuring the up-down tethers 40L and 40R, the left-right tether 45, and the front-rear tethers 50L and 50R, is formed of a fabric having flexibility formed of a polyester yarn, a polyamide yarn, or the like.

Next, manufacture of the airbag 20 of the embodiment will be described. The tether base members 62 and 62 configuring the up-down tethers 40L and 40R are placed so as to coincide on an inner surface side of the front left panel 55L and the front right panel 55R respectively. Further, an upper edge side and a lower edge side of each of the tether base members 62 and 62 are sewn to the front left panel 55L and the front right panel 55R over a whole length. At this time, the sewn regions 42UL, 42DL, 42UR, and 42DR are formed. Also, one end of the tether base members 63 and 63 configuring the left-right tether 45 is sewn to the inner surface side of each of the front left panel 55L and the front right panel 55R. The inner edges 60*a* of the rear left panel 60L and the rear right panel 60R are sewn to each other in advance. At this time, the ends of the two tether base members 65 and 65 configuring the upper and lower front-rear tethers 50U and 50D are sewn together in a state the tether base members 65 and 65 are sandwiched between the rear left panel 60L and the rear right panel 60R. The front left panel 55L and the front right panel 55R are placed so as to coincide, and the lower edges 55*b* and 55*b* are sewn to each other. At this time, an end of the tether base member 64 configuring the lower side front-rear tether 50D is sewn together in a state wherein the tether base member 64 also coincides to the front left panel 55L and the front right panel 55R. Next, the front left panel 55L and the front right panel 55R are opened in such a way that the upper edges 55*a* and 55*a* are separated from each other, and the protruding portions 57L and 57R are placed in such a way as to coincide with each other. The protruding portions 57L and 57R are sewn in a region that forms a peripheral edge of the inflow aperture 24. Next, the inflow aperture 24 and the attachment holes 25 are opened. Subsequently, the upper edges 55*a* and 55*a* of the front left panel 55L and the front right panel 55R are sewn to each other. At this time, an end of the tether base member 64 configuring the upper side front-rear tether 50U is sewn together in a state wherein the tether base member 64 also coincides to the front left panel 55L and the front right panel 55R. Next, the rear edge 55*c* of the front left panel 55L and the outer edge 60*b* of the rear left panel 60L are sewn together. In the same way, the rear edge 55*c* of the front right panel 55R and the outer edge 60*b* of the rear right panel 60R are sewn together. Subsequently, the bag main body 21 is inverted utilizing a region on front edge 55*d* sides of the front left panel 55L and the front right panel 55R, which are not yet sewn together. Utilizing this unsewn region, corresponding ends of the tether base members 63, 64, and 65 are sewn to each other, forming the front-rear tethers 50U and 50D and the left-right tether 45. Subsequently, the airbag 20 can be manufactured by folding each of the front edges 55*d* of the front left panel 55L and the front right panel 55R in two, and sewing using thread.

Next, mounting of the airbag device M1 in the vehicle V1 will be described. Firstly, the airbag 20 is folded in such a way that the airbag 20 can be housed inside the case 16 in a state wherein the retainer 13 is housed in the interior. A periphery of the folded airbag 20 is wrapped in an unshown wrapping member that can be ruptured when the airbag 20 inflates. Subsequently, the folded airbag 20 is housed inside the case 16 by causing the bolts 13*a* to protrude from the bottom wall portion 16*a*. Further, the main body portion 12*a* of the inflator 12 is inserted into the case 16 from below the bottom wall portion 16*a*. At this time, the bolts 13*a* of the retainer 13 protruding downward from the bottom wall portion 16*a* are inserted through the flange portion 12*c* of the inflator 12. The folded airbag 20 and the inflator 12 can be attached to the case 16 by fastening the nut 14 on to each bolts 13*a* protruding from the flange portion 12*c*. Subsequently, the peripheral wall portion 16*b* of the case 16 is caused to engage with the coupling wall portion 10*c* of the airbag cover 10 in the instrument panel 1 mounted in the vehicle. An unshown bracket provided on the case 16 is fixed to the body side of the vehicle, and the inflator 12 is electrically connected to an unshown control device. In this way, the airbag device M1 can be mounted in the vehicle V1.

When inflating gas is discharged from the gas discharge port of the inflator 12 after the mounting of the airbag device M1 in the vehicle V1, the airbag 20 inflates owing to the inflating gas being caused to flow into the interior. The inflating airbag 20 pushes open the door portions 10*a* and 10*b* of the airbag cover 10. The airbag 20 expands and inflates while protruding rearward and upward from the case 16 through the protrusion aperture 16*c*, which is formed by the door portions 10*a* and 10*b* of the airbag cover 10 being pushed open. Further, the airbag 20 completes the inflation, as shown by a two-dotted chain line in FIG. 1 and in FIGS. 7 to 9.

Further, the airbag device M1 of the first embodiment is such that inflating gas flows into an interior of the main body inflation portion 30 disposed on the rear end side of the airbag 20 through the conduit portion 23 which is disposed in such a way as to extend rearward from the inflator 12. The main body inflation portion 30 disposed on the rear side of the instrument panel 1 when inflation is completed is of a configuration disposed in such a way as to swell up and down and from left to right from the rear end 23*b* side of the conduit portion 23. In other words, the conduit portion 23 is of a tube form that approximately follows the front-rear direction, and is narrow up and down and from left to right in comparison with the main body inflation portion 30. This means that in an initial stage of inflation of the airbag 20, the conduit portion 23, which protrudes upward from the protrusion aperture 16*c* formed in the case 16 as a housing region, while inflating owing to inflating gas being caused to flow into an interior, can be appropriately restricted from pressing hard against the front windshield 5 disposed above the instrument panel 1. In particular, in the vehicle V1 in which the airbag device M1 of the first embodiment is mounted, an inclination of the front windshield 5 is comparatively small. However, even in the case that the airbag device M1 is mounted in this type of vehicle V1, the airbag 20 can be appropriately restricted from pressing hard against the front windshield 5 at expanding and inflating. Because of this, the airbag device M1 can also be suitably mounted in the type of vehicle V1 wherein the inclination of the front windshield 5 is small in this way.

Consequently, the airbag device M1 of the first embodiment is such that pressing hard against the front windshield 5 in an initial stage of inflation can be restricted, and the airbag 20 can be caused to inflate swiftly.

Also, the airbag device M1 of the first embodiment is such that when inflation of the airbag 20 is completed, the upper end 30*a* side (the upper side supported region 33) of the main body inflation portion 30 is supported by the front windshield 5. Also, when receiving an occupant when inflation is completed, a lower front face side (a front face side of the lower side supported region 34) of the main body inflation portion 30 is supported by the rear face (the rear face 3*a* of the rear face side region 3) of the instrument panel 1. Therefore, when the occupant MP (specifically, the upper body MU of the occupant MP) who moves forward is received by the rear face side (the rear wall portion 32) of the main body inflation portion 30 when inflation is completed, a forward movement of the main body inflation portion 30 itself can be regulated by a reactive force from the rear face 3*a* of the instrument panel 1 or the front windshield 5. That is, a further forward movement of the occupant MP is restricted by the main body inflation portion 30, and the occupant MP can be appropriately restrained. As a result, in the airbag device M1 of the first embodiment, even in the case of the airbag 20 wherein a region on the front end side when inflation is completed is the conduit portion 23, the occupant MP can be appropriately protected.

In particular, the airbag device M1 of the first embodiment is mounted on the front end side (the front end 2*a* side of the upper face side region 2) of the instrument panel 1, which is comparatively wide front to rear in such a way as to project significantly to the occupant MP side. Because of this, a distance from a mounting position (a position of the case 16) to a region in which the occupant MP is protected when inflation is completed (a position of the main body inflation portion 30 when inflation is completed) is long in comparison with the case of an existing top-mounted type passenger seat airbag device (an instrument panel 70 of a vehicle V2 in which an airbag device M2 of a second embodiment, to be described hereafter, is mounted). Even when the airbag 20 of the airbag device M1 of the first embodiment is mounted in the type of vehicle V1 including this kind of instrument panel 1, however, an increase in a capacity of the airbag itself can be extremely restricted. This is because the approximately tubular conduit portion 23 is disposed between the main body inflation portion 30, which protects the occupant MP when inflation is completed, and the case 16.

Also, in the airbag device M1 of the first embodiment, the conduit portion 23 is configured in such way as not to be in contact with the front windshield 5 when inflation of the airbag 20 is completed. Because of this, it can be appropriately restricted that the conduit portion 23 coming into contact with the front windshield 5 when the airbag 20 inflates. When this kind of point is not taken into consideration, an airbag of a configuration such that a conduit portion is disposed in proximity to a front windshield when inflation is completed may be used.

Furthermore, in the airbag device M1 of the first embodiment, the conduit portion 23 is of a configuration disposed in such a way as to approximately follow the upper face (the upper face $2b$ of the upper face side region 2) of the instrument panel 1 when inflation of the airbag 20 is completed. Because of this, a reactive force when an occupant is received by the main body inflation portion 30 can also be secured from the upper face $2b$ of the upper face side region 2 of the instrument panel 1, with which the lower face $23c$ of the conduit portion 23 when inflation is completed is brought into contact. When this kind of point is not taken into consideration, an airbag of a configuration such that a conduit portion is disposed apart from an instrument panel when inflation is completed may be used.

Figure 10:
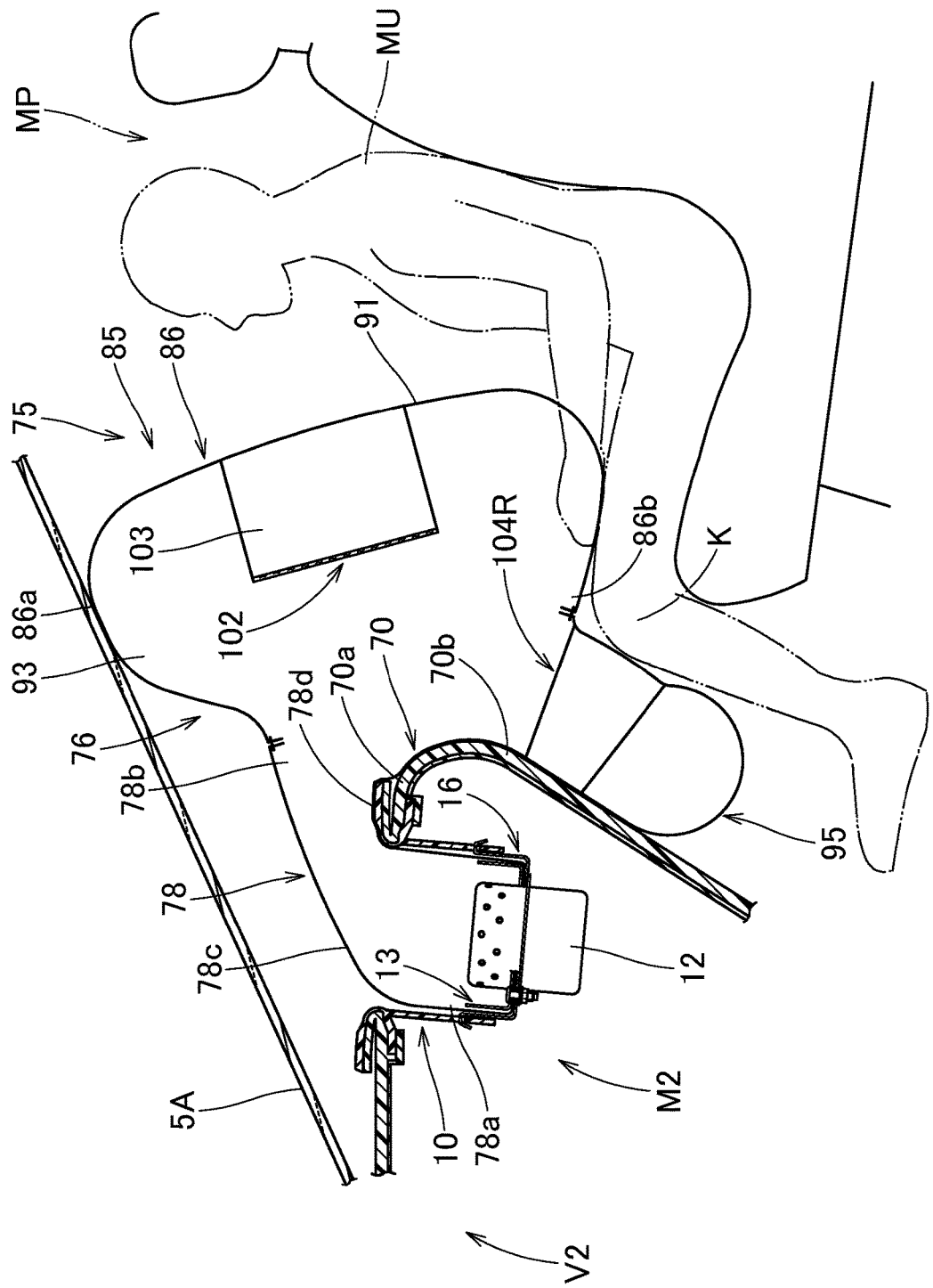
FIG. 10 is a schematic vertical sectional view showing a state wherein inflation of an airbag is completed in a passenger seat airbag device that is a second embodiment of the present disclosure.

Next, the airbag device M2 of the second embodiment of the invention will be described. As shown in FIG. 10, in the vehicle V2 in which the airbag device M2 of the second embodiment of the invention is mounted, the instrument panel 70 is such that an amount of projection to the occupant side is set to be small in comparison with that of the instrument panel 1 of the vehicle V1 in which the airbag device M1 of the first embodiment is mounted. The instrument panel 70 is curved in an approximate reverse C form in cross-section in such a way that a lower side inclines forward (refer to FIG. 10). Also, in the vehicle V2, a front windshield 5A is configured in such a way that inclination with respect to a horizontal direction is comparatively small, in the same way as the front windshield 5 of the vehicle V1. Further, the airbag device M2 of the second embodiment is mounted in a front-rear intermediate region on an upper face $70a$ side of the instrument panel 70.

As shown in FIG. 10, the airbag device M2 is of approximately the same configuration as the airbag device M1, with the exception of an airbag 75. Because of this, identical reference signs are allotted to identical members, and a detailed description thereof will be omitted.

As shown in FIG. 10, the airbag 75 is disposed between the instrument panel 70 and the front windshield 5A when inflation is completed. As shown in FIGS. 11 to 16, the airbag 75 includes a bag main body 76, a left-right tether 102, a front-rear tether 103, and thickness regulating tethers 104L and 104R, which are disposed in an interior of the bag main body 76 and regulate a form of the bag main body 76 when inflation is completed. The bag main body 76 includes a conduit portion 78, and a main body inflation portion 85 disposed on a rear end $78b$ side of the conduit portion 78. A form of the airbag 75 when inflation is completed is also a form having approximate bilateral symmetry centered on an inflow aperture 79, to be described hereafter, formed in the conduit portion (refer to FIGS. 12, 13, and 18).

Figure 11:
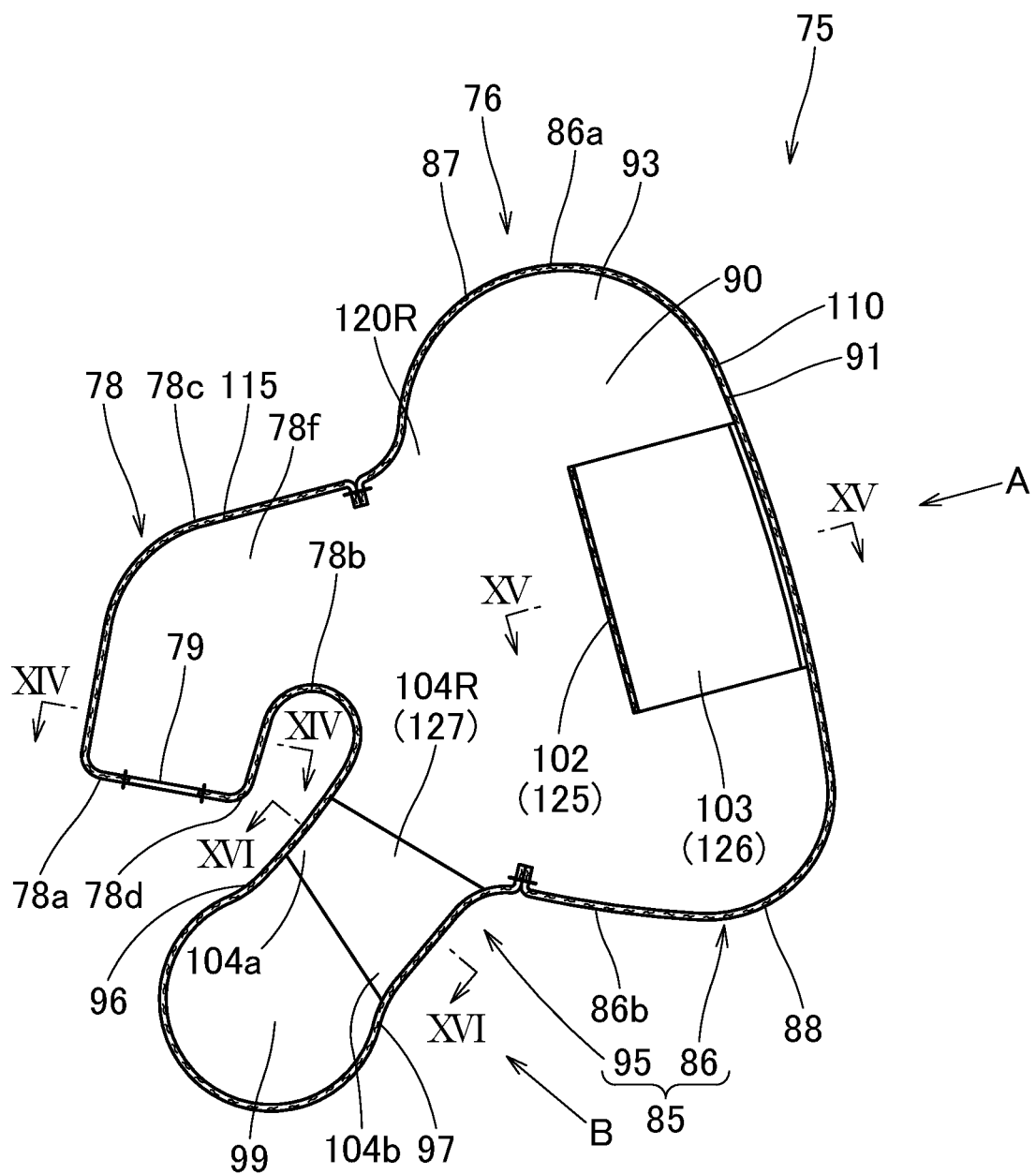
FIG. 11 is a schematic vertical sectional view showing a state wherein an airbag used in the passenger seat airbag device of the second embodiment is individually inflated.
Figure 12:
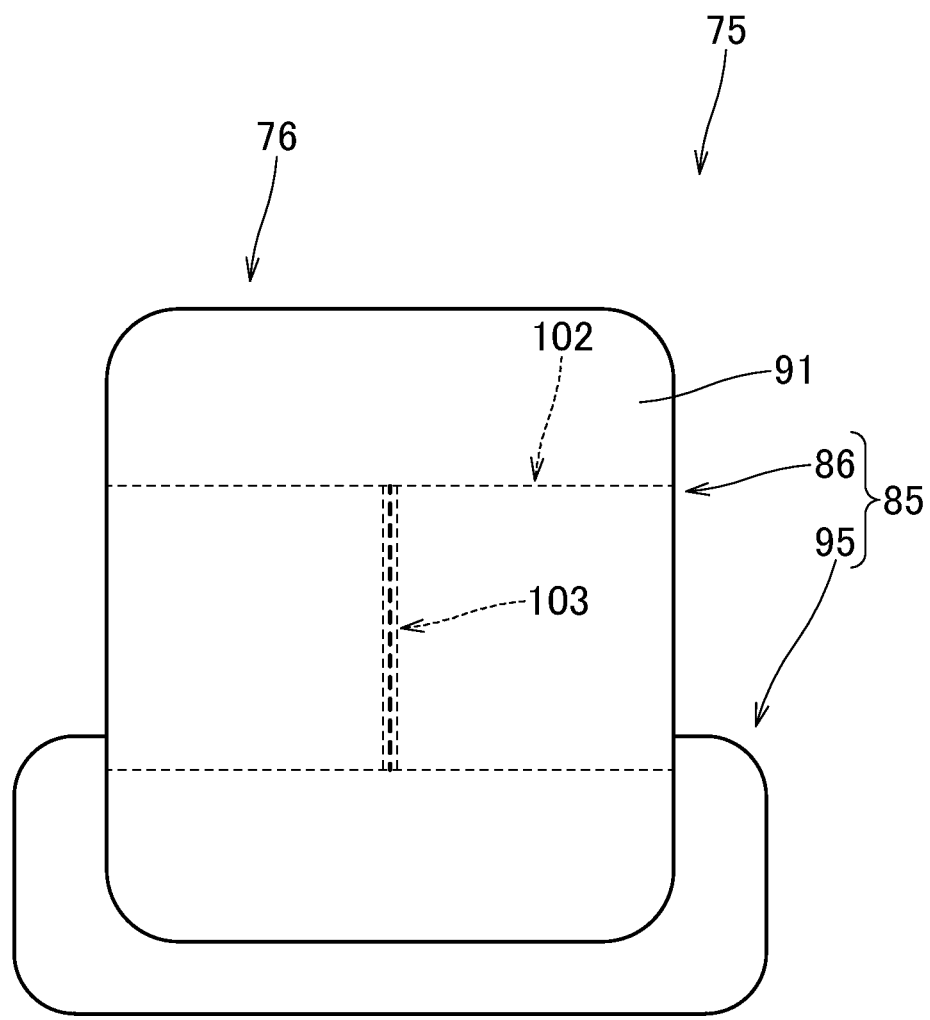
FIG. 12 is a schematic rear view wherein the airbag of FIG. 11 is seen from an A direction side.
Figure 17:
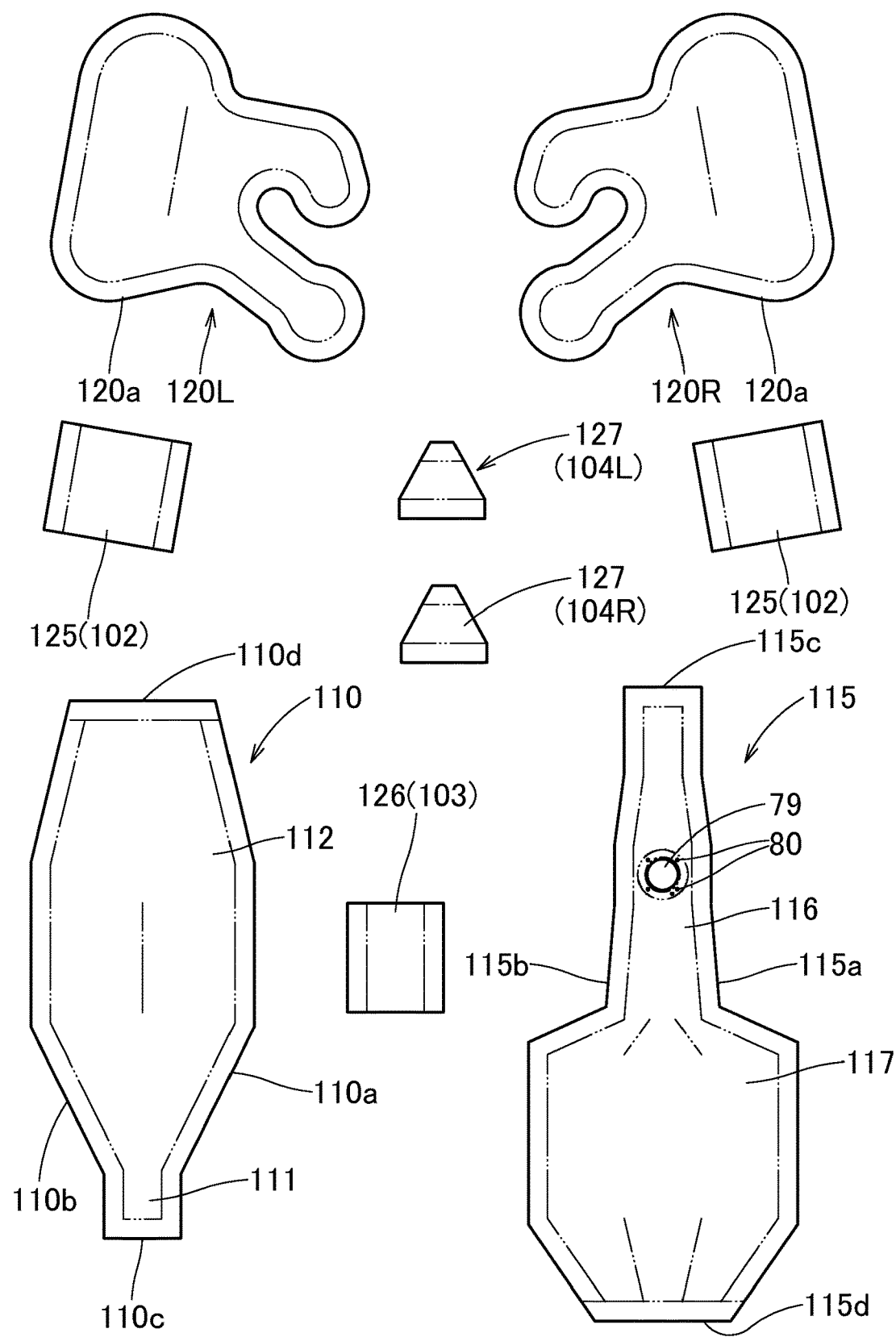
FIG. 17 is a plan view of a state wherein panels configuring the airbag of FIG. 11 are arrayed.
Figure 18:
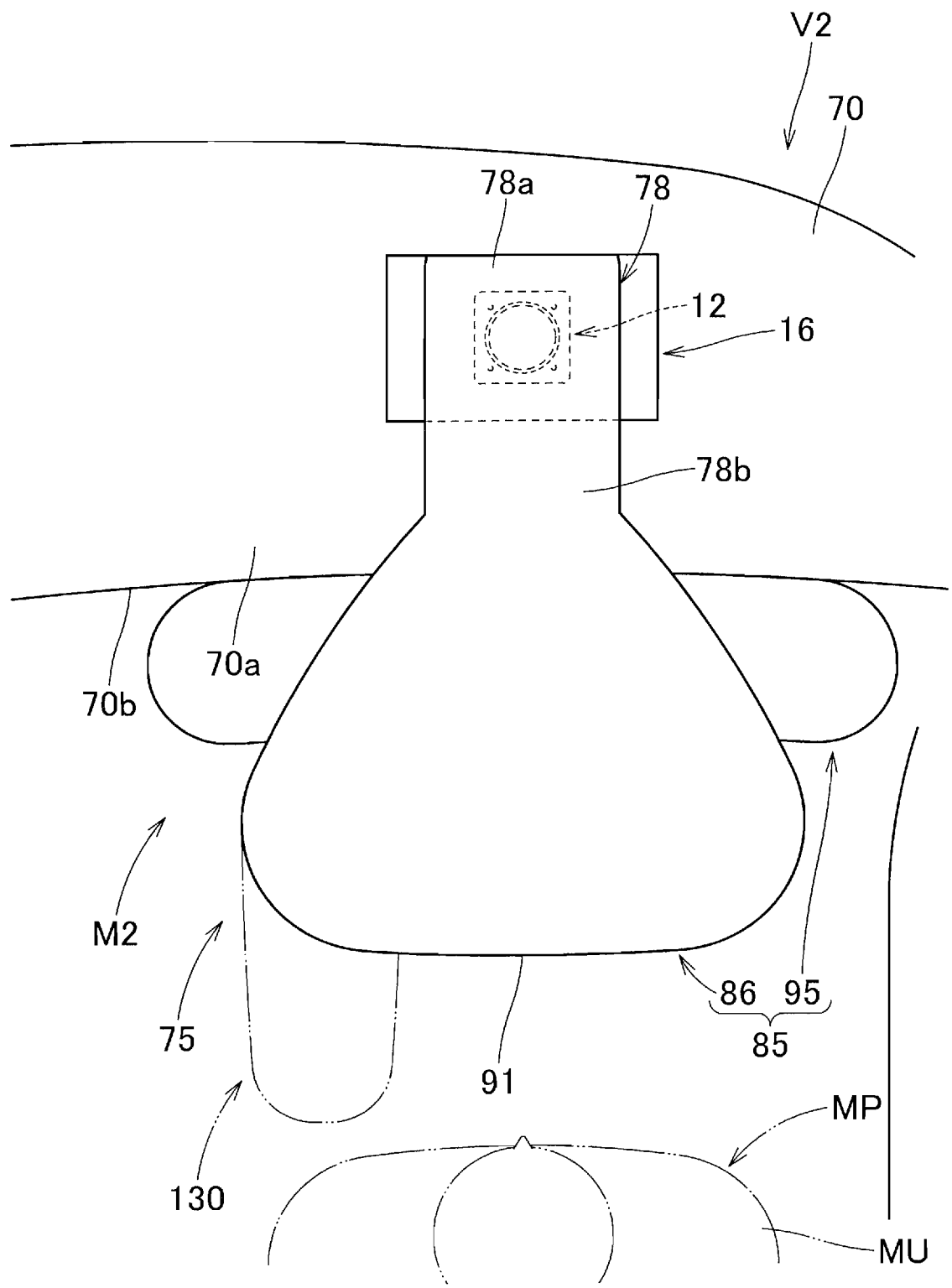
FIG. 18 is a schematic plan view showing a state wherein inflation of the airbag is completed in the passenger seat airbag device of the second embodiment.

The conduit portion 78 is a region disposed on the upper face $70a$ side of the instrument panel 70 when inflation of the airbag 75 is completed. As shown in FIGS. 11 and 18, the conduit portion 78 is of an approximately tubular form that approximately follows the front-rear direction and whose front end $78a$ side is closed off. The conduit portion 78 is connected to the inflator 12 on the front end $78a$ side. In the case of the embodiment, the conduit portion 78 includes an upper wall portion $78c$ and a lower wall portion $78d$, which are opposed up and down when inflation is completed, and a left wall portion $78e$ and a right wall portion $78f$, which are opposed left and right when inflation is completed (refer to FIG. 14). The inflow aperture 79 and four attachment holes 80 are formed on a lower face side (in the lower wall portion $78d$) of the conduit portion 78 when inflation is completed, in the same way as in the case of the airbag 20 (refer to FIGS. 11 and 17). A width dimension between left-right direction sides of the conduit portion 78 is also set to be smaller than the main body inflation portion 85. Specifically, the width dimension between left-right direction sides of the conduit portion 78 is set to be smaller than the width dimension between left-right direction sides of the case 16. Also, the width dimension between left-right direction sides of the conduit portion 78 is approximately constant over a whole front-rear region (refer to FIG. 18). The conduit portion 78 is also disposed in such a way as to cover the upper face side of the instrument panel 70 when inflation of the bag main body 76 is completed when mounted in a vehicle, in a state of non-contact with the front windshield 5A (in a state such that a gap is provided between the front windshield 5A and the conduit portion 78) (refer to FIG. 10). Also, as shown in FIG. 10, the conduit portion 78 is also disposed in such a way as to approximately follow the upper face $70a$ of the instrument panel 70 when inflation of the bag main body 76 is completed (in such a way as to be in contact with the upper face $70a$ of the instrument panel 70 over approximately a whole face on a lower face side of the lower wall portion $78d$).

The main body inflation portion 85 is of a configuration such as to swell up and down and to the left and right from a rear end side of the conduit portion 78. The main body inflation portion 85 is disposed on a rear side of the instrument panel 70 when inflation of the bag main body 76 is completed when mounted in a vehicle, and is configured in such a way as to be able to protect a region from the upper body MU to knees K of the occupant MP seated in the passenger seat (refer to FIGS. 10 and 18). Specifically, as shown in FIG. 10, the main body inflation portion 85 includes an upper body protecting portion 86, which is disposed on an upper side when inflation is completed and protects the upper body MU, and a knee protecting portion 95, which is disposed on a lower side when inflation is completed and protects the knees K.

The upper body protecting portion 86 is configured in such a way as to swell upward from the conduit portion 78 and to both left and right sides when inflation of the bag main body 76 is completed. A form of the upper body protecting portion 86 when inflation is completed is a flattened approximately triangular prism form whose axial direction is aligned with the left-right direction. The upper body protecting portion 86 includes a rear wall portion 91, which is disposed on the occupant MP side when inflation is completed; an upper wall portion 87 and a lower wall portion 88, which are opposed up and down when inflation is completed; and a left wall portion 89 and a right wall portion 90, which are opposed left and right when inflation is completed (refer to FIGS. 10, 11, and 15). The rear wall portion 91 is disposed approximately following a vertical direction in such a way as to oppose the upper body MU of the occupant MP when inflation is completed when mounted in a vehicle (refer to FIG. 10). Also, when inflation of the bag main body 76 is completed, an upper end 86a side of the upper body protecting portion 86 is supported by being brought into contact with the front windshield 5A. As shown in FIG. 18, a width dimension between left-right direction sides of the upper body protecting portion 86 when inflation is completed is set to be greater than the width dimension between left-right direction sides of the conduit portion 78. This is in order to be able to extensively cover a space in front of the upper body MU of the occupant MP seated in the passenger seat. Further, a region (an upper side supported region 93) on the upper end 86a side of the upper body protecting portion 86 when inflation is completed is supported by being brought into contact with the front windshield 5A over approximately a whole left-right region. In the same way as in the case of the airbag 20, the upper side supported region 93 is such that an amount in contact with the front windshield 5A (a contact area) is set in such a way as to satisfy the following configuration. Even when receiving the upper body MU of the occupant MP who moves forward, the upper side supported region 93 can maintain a state of being in contact with the front windshield 5A.

The knee protecting portion 95 is configured in such a way as to swell downward from the conduit portion 78 when inflation of the bag main body 76 is completed. The knee protecting portion 95 is disposed in such a way as to extend to below the upper body protecting portion 86. The knee protecting portion 95 is disposed to the rear of a region on a lower portion side of the instrument panel 70 when inflation of the bag main body 76 is completed. The knee protecting portion 95 is disposed in such a way as to approximately follow a rear face 70b on the lower portion side of the instrument panel 70. The knee protecting portion 95 inclines in such a way as to extend forward and downward from a front lower end 86b side of the upper body protecting portion 86 when seen from left and right sides (refer to FIGS. 10 and 11). In the knee protecting portion 95 in a state seen from front and rear direction sides, a region on an upper side that forms the upper body protecting portion 86 side is a narrow portion 95a, which becomes narrower toward an upper end side, and a region on a lower side is a wide portion 95b, which is wide in left to right (refer to FIG. 13). Specifically, the knee protecting portion 95 includes a front wall portion 96 and a rear wall portion 97, which are opposed front and rear when inflation is completed, and a left wall portion 98 and a right wall portion 99, which are opposed left and right (refer to FIG. 16). The knee protecting portion 95 is configured in such a way that a front face side (a region of the front wall portion 96) is brought into contact with the rear face 70b of the instrument panel 70 when inflation is completed (refer to FIGS. 10 and 11). That is, in the airbag 75 of the embodiment, a whole of the knee protecting portion 95 is supported by the rear face 70b of the instrument panel 70 when inflation of the bag main body 76 is completed. A width dimension between left-right direction sides of the knee protecting portion 95 (specifically, a width dimension of the wide portion 95b) when inflation is completed is set to be greater than a width dimension between left-right direction sides of the upper body protecting portion 86 (refer to FIGS. 12, 13, and 18). This is in order to be able to extensively cover a space in front of left and right knees of the occupant MP. A thickness of the knee protecting portion 95 when inflation is completed is set in such a way as to satisfy the following configuration. When the knee protecting portion 95 receives the knees K of the occupant MP who moves forward, bottoming on the instrument panel 70 is restricted, and the knees K can be appropriately protected.

The left-right tether 102 is disposed inside a region of the upper body protecting portion 86. The left-right tether 102 is for regulating a form of the upper body protecting portion 86 when inflation is completed when inflation of the bag main body 76 is completed. The left-right tether 102 couples the left wall portion 89 and the right wall portion 90 in approximate front-rear and up-down centers of the upper body protecting portion 86 when inflation is completed. The left-right tether 102 is disposed in such a way as to approximately follow the left-right direction while a width direction is approximately aligned with the up-down direction (refer to FIGS. 11, 12, and 15). The left-right tether 102 is configured by joining two tether base members 125 and 125 linearly.

The front-rear tether 103 is disposed inside a region of the upper body protecting portion 86. The front-rear tether 103 is for regulating a form of the upper body protecting portion 86 when inflation of the bag main body 76 is completed. The front-rear tether 103 couples an approximate left-right center of the left-right tether 102 and approximate up-down and left-right centers of the rear wall portion 97 of the upper body protecting portion 86. The front-rear tether 103 is such that a strip-form tether member 126 is disposed approximately following the front-rear direction, with a width direction caused to approximately follow the up-down direction (refer to FIGS. 11 and 15). Width dimensions of the front-rear tether 103 and the left-right tether 102 are set to be approximately the same.

Figure 13:
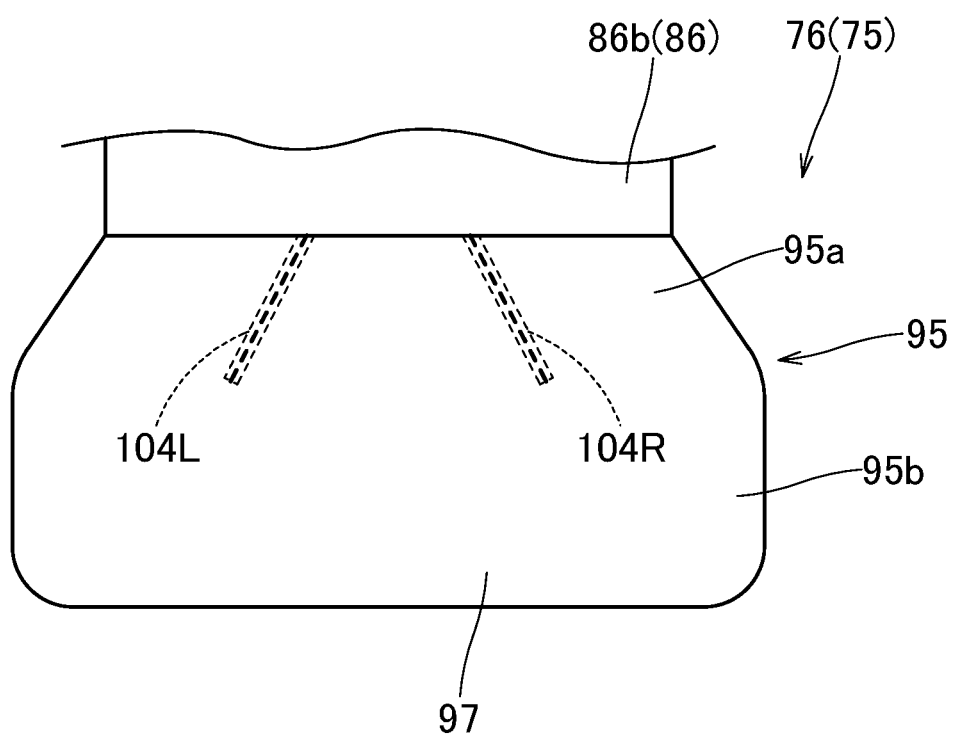
FIG. 13 is a schematic rear view wherein the airbag of FIG. 11 is seen from a B direction side.
Figure 14:
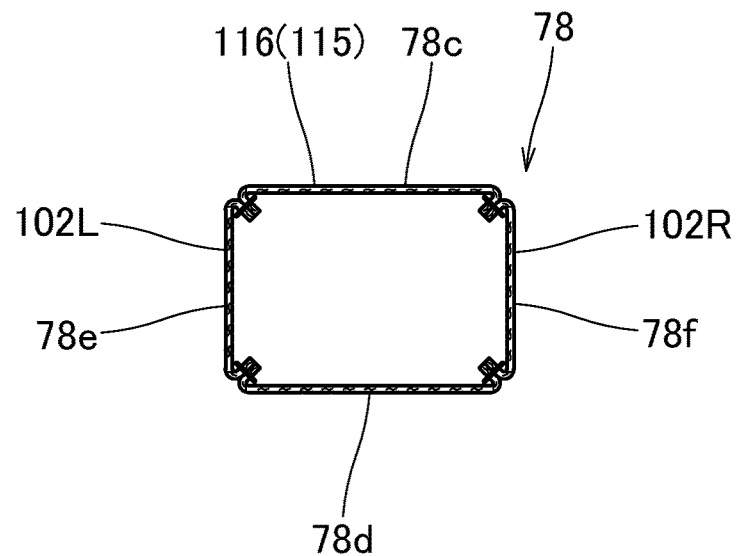
FIG. 14 is a schematic sectional view of the airbag of FIG. 11, and corresponds to a XIV-XIV region.
Figure 15:
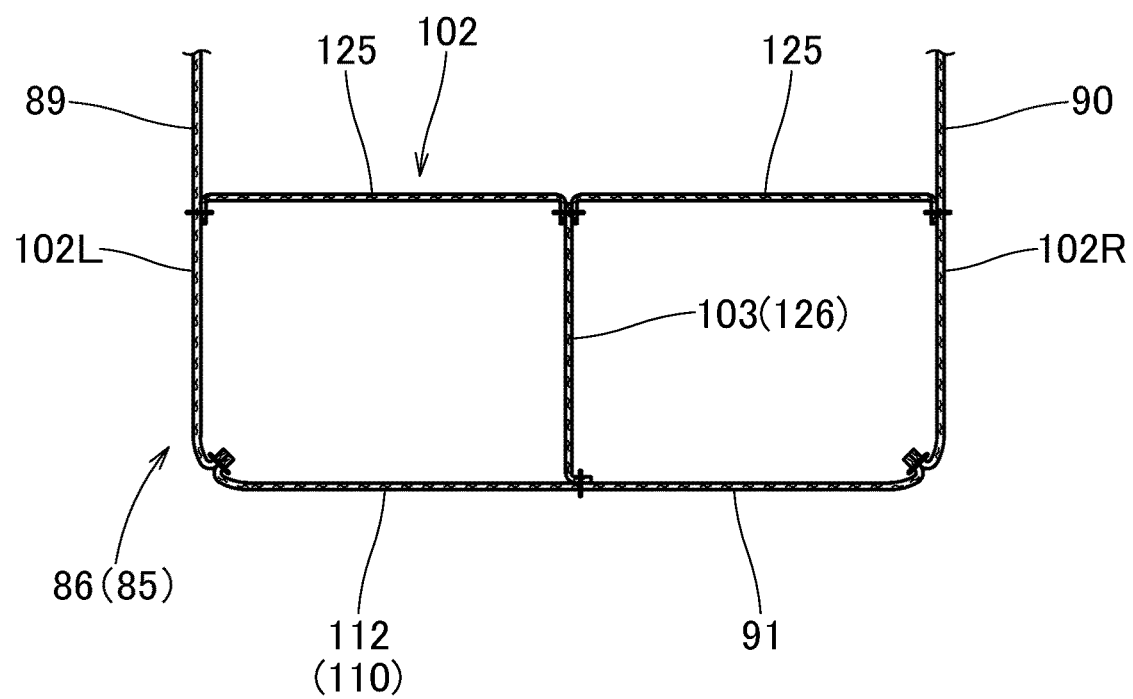
FIG. 15 is a schematic sectional view of the airbag of FIG. 11, and corresponds to a XV-XV region.
Figure 16:
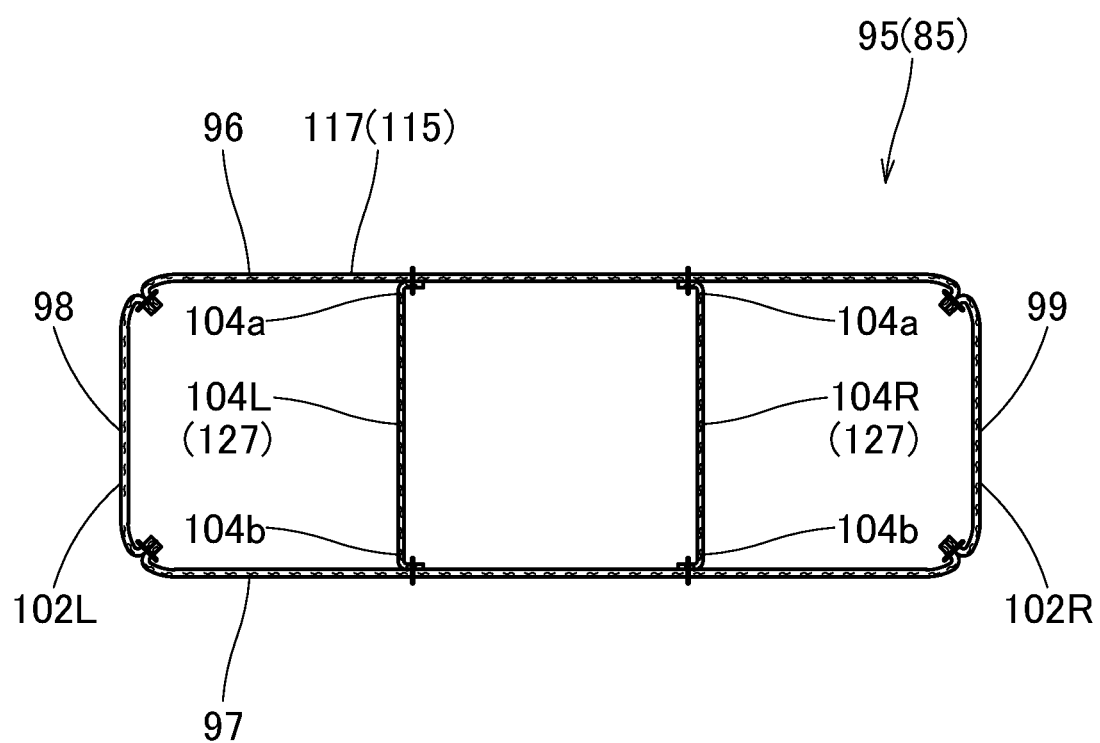
FIG. 16 is a schematic sectional view of the airbag of FIG. 11, and corresponds to a XVI-XVI region.

The thickness regulating tethers 104L and 104R are disposed inside a region of the knee protecting portion 95. The thickness regulating tethers 104L and 104R are for regulating a thickness of the knee protecting portion 95 when inflation of the bag main body 76 is completed. The two thickness regulating tethers 104L and 104R are disposed in parallel on left-right direction sides. Specifically, the thickness regulating tethers 104L and 104R are disposed inside a region of the narrow portion 95a in the knee protecting portion 95, as shown in FIG. 13. As shown in FIG. 17, the thickness regulating tethers 104L and 104R are configured of approximately trapezoidal tether base members 127 and 127. The tether base member 127 is such that an end portion on a narrow side is positioned on a front side (the front wall portion 96 side). The thickness regulating tethers 104L and 104R are disposed in such a way as to be expanded toward a rear end 104b side, which forms the occupant MP side, with a front end 104a side being narrow (refer to FIGS. 10 and 11). Also, the thickness regulating tethers 104L and 104R are disposed with a width direction inclined with respect to the up-down direction (in an arrowhead form as seen from front-rear direction sides), in such a way that upper edge sides are caused to approach each other (refer to FIG. 13).

The bag main body 76 is configured in a bag form by peripheral edges of base members (base fabric) of predetermined forms being joined together. In the case of the embodiment, the bag main body 76 is configured of a top rear side panel 110, a bottom front side panel 115, a left side panel 120L, and a right side panel 120R, as shown in FIG. 17.

The top rear side panel 110 configures a region to the rear side of the upper wall portion 78c of the conduit portion 78 and a region from the upper wall portion 87 through the rear wall portion 91 to the lower wall portion 88 of the upper body protecting portion 86 in the main body inflation portion 85. As shown in FIG. 17, the top rear side panel 110 is of an elongated form such that linearly couples a conduit portion configuring portion 111 which configures the upper wall portion 78c of the conduit portion 78, and a main body configuring portion 112 which configures the main body inflation portion 85, and is of a form having approximate bilateral symmetry. The bottom front side panel 115 configures a region from the lower wall portion 78d to a front side of the upper wall portion 78c of the conduit portion 78, and a region from the front wall portion 96 to the rear wall portion 97 of the knee protecting portion 95. The bottom front side panel 115 is also of an elongated form such that linearly couples a conduit portion configuring portion 116 which configures the conduit portion 78, and a main body configuring portion 117 which configures the knee protecting portion 95, and is of a form having approximate bilateral symmetry (refer to FIG. 17). External forms of the left side panel 120L and the right side panel 120R are forms having approximate bilateral symmetry. The left side panel 120L configures a region of the left wall portion 78e of the conduit portion 78, a region of the left wall portion 89 of the upper body protecting portion 86, and a region of the left wall portion 98 of the knee protecting portion 95. The right side panel 120R configures a region of the right wall portion 78f of the conduit portion 78, a region of the right wall portion 90 of the upper body protecting portion 86, and a region of the right wall portion 99 of the knee protecting portion 95. The bag main body 76 is formed in a bag form by corresponding short edges 110c, 115c, 110d, and 115d of the top rear side panel 110 and the bottom front side panel 115 being joined (sewn) to each other, outer edge 120a of the left side panel 120L and long edges 110a, 115a of the top rear side panel 110 and the bottom front side panel 115 being joined (sewn) to each other, and outer edge 120a of the right side panel 120R and long edges 110b, 115b of the top rear side panel 110 and the bottom front side panel 115 being joined (sewn) to each other.

Each of the top rear side panel 110, the bottom front side panel 115, the left side panel 120L, and the right side panel 120R configuring the bag main body 76, and the tether base members 125, 126, and 127 configuring the left-right tether 102, the front-rear tether 103, and the thickness regulating tethers 104L and 104R, is formed of a fabric having flexibility formed of a polyester yarn, a polyamide yarn, or the like.

The airbag device M2 of the second embodiment in which this kind of airbag 75 is used is also such that inflating gas flows into an interior of the main body inflation portion 85 disposed on the rear end side of the airbag 75 through the conduit portion 78, which is disposed in such a way as to extend rearward from the inflator 12. The main body inflation portion 85 disposed on the rear side of the instrument panel 70 when inflation is completed is of a configuration disposed in such a way as to swell up and down and from left to right from the rear end 78b side of the conduit portion 78. In other words, the conduit portion 78 is of a tube form that approximately follows the front-rear direction, and is narrow up and down and from left to right in comparison with the main body inflation portion 85. This means that in an initial stage of inflation of the airbag 75, the conduit portion 78, which protrudes upward from the protrusion aperture 16c formed in the case 16, while inflating owing to inflating gas being caused to flow into an interior, can be appropriately restricted from pressing hard against the front windshield 5A disposed above the instrument panel 70.

Also, the airbag device M2 of the second embodiment is such that as the main body inflation portion 85 is of a configuration including the knee protecting portion 95, the knees K can be protected by the knee protecting portion 95 at the same time as the upper body MU is protected by the main body inflation portion 85. Because of this, there is no need to mount a separate knee protecting device, enabling a reduction in the number of parts and a reduction in weight.

Furthermore, the airbag device M2 of the second embodiment is such that when inflation of the airbag 75 is completed, the upper end 86a side (the upper side supported region 93) of the upper body protecting portion 86 of the main body inflation portion 85 is supported by the front windshield 5A. Also, when receiving an occupant when inflation is completed, a lower front face side (a front face side of the knee protecting portion 95) of the main body inflation portion 85 is supported by the rear face 70b of the instrument panel 70. Therefore, when the occupant MP (the upper body MU of the occupant MP) who moves forward is received by the rear face side (the rear wall portion 91 of the upper body protecting portion 86) of the main body inflation portion 85 when inflation is completed, a forward movement of the main body inflation portion 85 itself can be regulated by a reactive force from the rear face 70b of the instrument panel 70 or the front windshield 5A. That is, a further forward movement of the occupant MP is restricted by the main body inflation portion 85, and the occupant MP can be appropriately restrained. As a result, in the airbag device M2 of the second embodiment, even in the case of the airbag 75 wherein a region on the front end side when inflation is completed is the conduit portion 78, the occupant MP can be appropriately protected. In particular, in the airbag device M2 of the second embodiment, the region supported by the rear face 70b of the instrument panel 70 (the knee protecting portion 95) is large in comparison with the case of the airbag 20 of the airbag device M1 of the first embodiment, and a large area of contact with the instrument panel 70 can be secured. Because of this, the reactive force received from the instrument panel 70 can be further increased, and the upper body MU can be more stably received by the upper body protecting portion 86.

Figure 19:
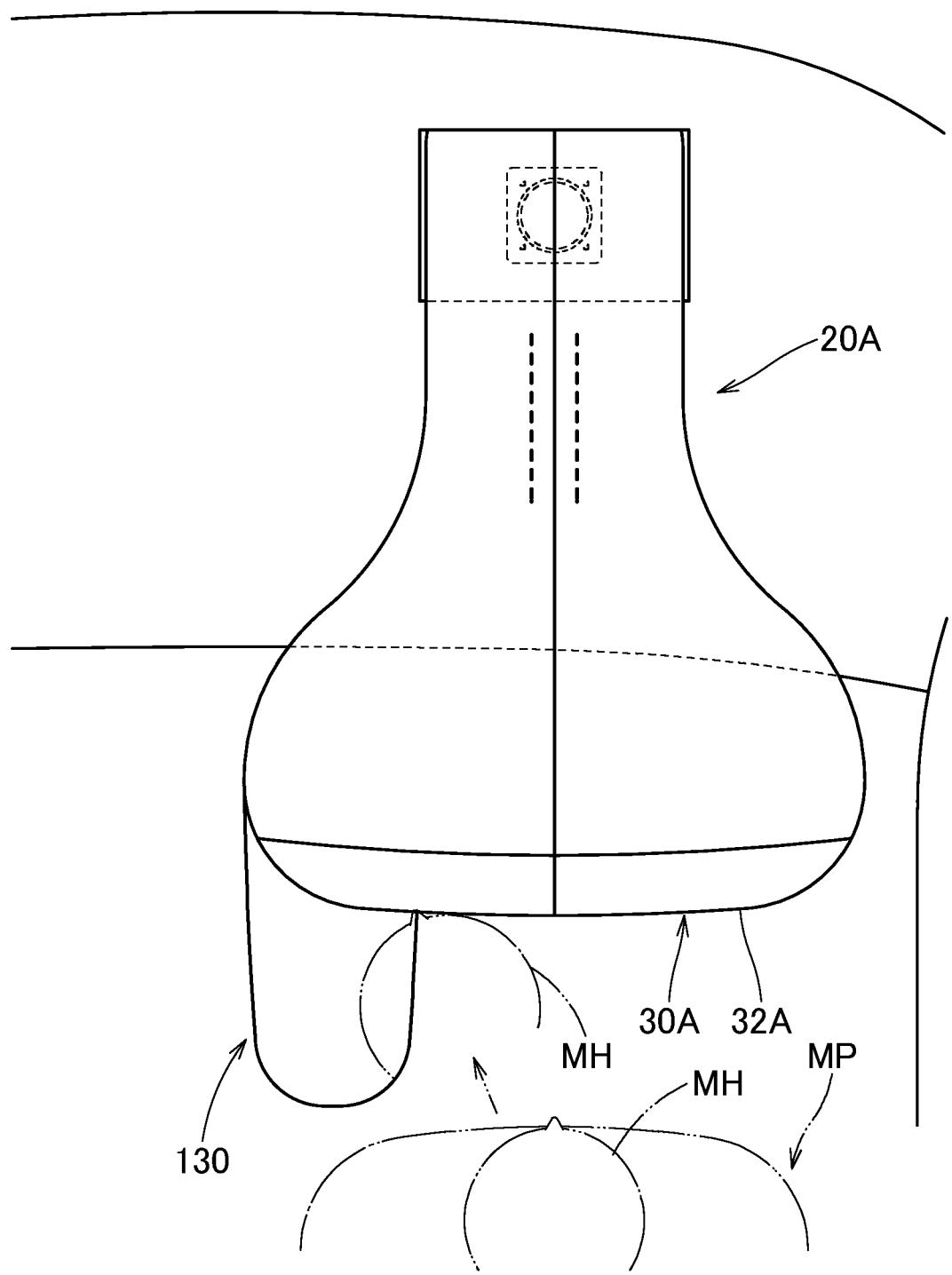
FIG. 19 is a schematic plan view of a state wherein an airbag of a modification is inflated in a state mounted in a vehicle.
Figure 20:
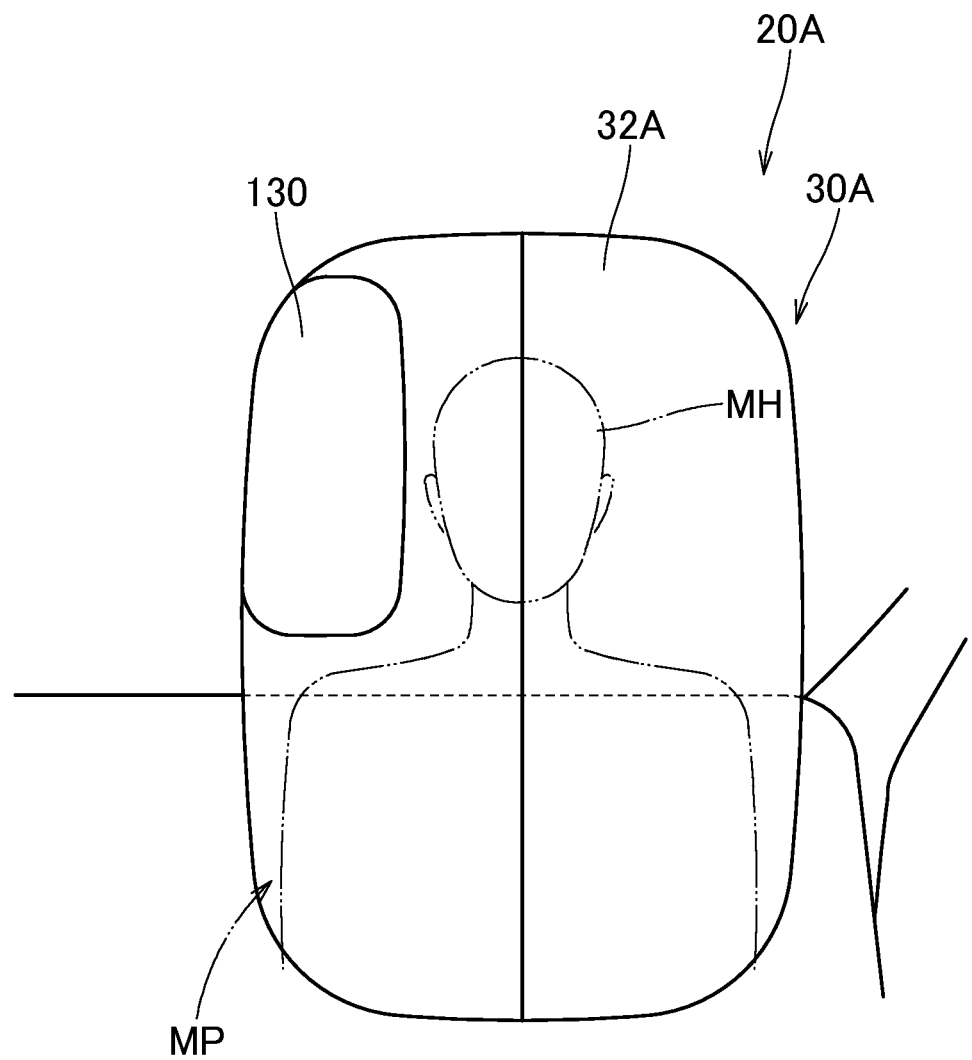
FIG. 20 is a schematic rear view of a state wherein the airbag of FIG. 19 is inflated in a state mounted in a vehicle.

Also, an airbag of a configuration, as shown in FIGS. 19 and 20, may be used as an airbag 20A. In the airbag 20A, a protruding inflation portion 130, which inflates in such a way as to protrude rearward from a rear wall portion 32A, is disposed in a vicinity of an end portion (in the case of the embodiment, a left end) on a central side in a vehicle width direction when inflation of a main body inflation portion 30A. The rear wall portion 32A is a region that receives the upper body MU of the occupant MP, who moves forward when the vehicle is in a head-on collision, as an occupant protecting face. Specifically, the protruding inflation portion 130 is disposed in a position diagonally left in front of the occupant MP seated in the passenger seat when inflation of the airbag 20A is completed. The protruding inflation portion 130 is such that an amount of protrusion from the rear wall portion 32A (a width between front-rear direction sides) and a width between up-down direction sides are to set to be dimensions such that a head portion of an occupant who moves diagonally forward to the left can be restrained, when the vehicle is in an oblique collision or an offset collision. When this kind of airbag 20A is used, a head portion MH of the occupant MP who moves diagonally forward in such a way as to head toward the central side in the vehicle width direction (left side) can also be restrained by the protruding inflation portion 130, in the case of an oblique collision, an offset collision, or the like, wherein an impact force acts from diagonally ahead. Because of this, the occupant MP can be appropriately protected not only when the vehicle is in a head-on collision, but also when the vehicle is in an oblique collision or in an offset collision. Also, the airbag 75 may also be of a configuration such that, in the same way, the protruding inflation portion 130 that protrudes toward the rear from the rear wall portion 91 is disposed in a vicinity of an end portion on the central side in the vehicle width direction of the upper body protecting portion 86 of the main body inflation portion 85, as shown by a two-dotted chain line in FIG. 18.

In the embodiments, the airbags 20, 20A, and 75 are of a configuration wherein the lower front face sides of the main body inflation portions 30, 30A, and 85 (the lower side supported region 34 and the front face side of the knee protecting portion 95) are supported by the rear faces of the instrument panels 1 and 70 in a state wherein inflation is completed. However, an airbag is not limited to this kind of configuration. For example, an airbag may be of a configuration wherein a region on a lower side is in a state of non-contact with a rear face of an instrument panel when inflation is completed, and comes into contact with the instrument panel, and is supported by the instrument panel, when receiving an occupant.

The present disclosure relates to a passenger seat airbag device of the following configuration.

The passenger seat airbag device disposed on an upper face side of an instrument panel in front of a passenger seat includes the following:
an inflator;
an airbag that can inflate owing to an inflating gas being caused to flow into an interior, the airbag being configured such that when the airbag inflates owing to an inflating gas discharged from the inflator being caused to flow into the interior, the airbag inflates in such a way as to expand toward a rear while protruding upward from a protrusion aperture formed in the housing region; and
a housing region in which the folded airbag and the inflator are housed, wherein
the airbag includes
a conduit portion that is connected to the inflator on a front end side and is disposed in such a way as to extend approximately following a front-rear direction when inflation is completed, and
a main body inflation portion that is configured in such a way as to swell up and down and from left to right from a rear end side of the conduit portion, is disposed to a rear side of the instrument panel when inflation is completed, and can protect an occupant seated in the passenger seat, and
the main body inflation portion is configured in such a way that an upper end side when inflation is completed is supported by a front windshield disposed above the instrument panel, and a lower front face side is supported by a rear face of the instrument panel when receiving an occupant when inflation is completed.

The passenger seat airbag device of the present disclosure is such that inflating gas flows into an interior of the main body inflation portion disposed on a rear end side of the airbag through the conduit portion disposed in such a way as to extend rearward from the inflator. The main body inflation portion disposed to the rear side of the instrument panel when inflation is completed, is of a configuration disposed in such a way as to swell up and down and from left to right from the rear end side of the conduit portion. In other words, the conduit portion is of a tube form that approximately follows a front-rear direction, and is narrow up and down and from left to right in comparison with the main body inflation portion. This means that in an initial stage of inflation of the airbag, the conduit portion, which protrudes upward from a protrusion aperture formed in a housing region, while inflating owing to inflating gas being caused to flow into an interior, can be appropriately restricted from pressing hard against the front windshield disposed above the instrument panel.

Consequently, the passenger seat airbag device of the present disclosure is such that pressing hard against the front windshield in an initial stage of inflation can be restricted, and the airbag can be caused to inflate swiftly.

Also, the passenger seat airbag device of the present disclosure is such that when inflation of the airbag is completed, the upper end side of the main body inflation portion is supported by the front windshield. When receiving an occupant when inflation is completed, the lower front face side of the main body inflation portion is supported by the rear face of the instrument panel. Therefore, when the occupant who moves forward is received by the rear face side of the main body inflation portion when inflation is completed, a forward movement of the main body inflation portion itself can be regulated by a reactive force from the rear face of the instrument panel or the front windshield. That is, a further forward movement of the occupant is restricted by the main body inflation portion, and the occupant can be appropriately restrained. As a result, in the passenger seat airbag device of the present disclosure, even in the case of the airbag wherein a region on a front end side when inflation is completed is the conduit portion, the occupant can be appropriately protected.

Furthermore, the passenger seat airbag device of the present disclosure is preferably of a configuration such that the conduit portion is not in contact with the front windshield when inflation of the airbag is completed. By adopting this kind of configuration, the conduit portion coming into contact with the front windshield can be appropriately restricted.

Further still, the passenger seat airbag device of the heretofore described configuration is preferably of a configuration such that the conduit portion is disposed in such a way as to approximately follow an upper face of the instrument panel when inflation of the airbag is completed. By adopting this kind of configuration, a reactive force when an occupant is received by the main body inflation portion can also be secured from the upper face of the instrument panel, with which a lower face of the conduit portion when inflation is completed is brought into contact.

Further still, the passenger seat airbag device of the heretofore described configuration may also be such that the main body inflation portion is of a configuration having a knee protecting portion disposed in front of knees of the occupant when inflation is completed on a lower side when inflation is completed. By adopting this kind of configuration, the knees can be protected by the knee protecting portion at the same time as an upper body is protected by the main body inflation portion. Because of this, there is no need to mount a separate knee protecting device, enabling a reduction in the number of parts and a reduction in weight, which is desirable.

Further still, the passenger seat airbag device of the heretofore described configuration is preferably of a configuration wherein the rear face side of the main body inflation portion when inflation is completed is configured as an occupant protecting face that can receive an occupant who moves forward when a vehicle is in a head-on collision, and a protruding inflation portion that inflates in such a way as to protrude rearward from the occupant protecting face is formed in a vicinity of an end portion on a central side in a vehicle width direction when inflation of the main body inflation portion is completed.

When a passenger seat airbag device has this kind of configuration, a head portion of an occupant who moves diagonally forward in such a way as to head toward the central side in the vehicle width direction can also be restrained by the protruding inflation portion, in a case of an oblique collision, an offset collision, or the like, wherein an impact force acts from diagonally ahead. Because of this, the occupant can be appropriately protected not only when there is a head-on collision, but also when there is an oblique collision or an offset collision.

What is claimed is:

1. A passenger seat airbag device disposed on an upper face side of an instrument panel in front of a passenger seat, comprising:
    an inflator;
    an airbag that can inflate owing to an inflating gas being caused to flow into an interior, the airbag being configured such that when the airbag inflates owing to an inflating gas discharged from the inflator being caused to flow into the interior; and
    a housing region in which the folded airbag and the inflator are housed, wherein
    the airbag inflates in such a way as to expand toward a rear while protruding upward from a protrusion aperture formed in the housing region;
    the airbag includes
        a conduit portion that is connected to the inflator on a front end side and is disposed in such a way as to extend approximately following a front-rear direction when inflation is completed,
        a main body inflation portion that is configured in such a way as to swell up and down and from left to right from a rear end side of the conduit portion, is disposed to a rear side of the instrument panel when inflation is completed, and can protect an occupant seated in the passenger seat, and
        at least one up-down tether disposed inside the conduit portion, the at least one up-down tether is configured to regulate a thickness of the conduit portion when inflation of the airbag is completed,
    the at least one up-down tether comprising two up-down tethers disposed in parallel on left-right direction sides,
    the main body inflation portion is configured in such a way that an upper end side when inflation is completed is supported by coming into contact with a front windshield disposed above the instrument panel, and a lower front face side is supported by a rear face of the instrument panel when receiving an occupant when inflation is completed, the upper end side is adapted to come into contact with the front windshield over approximately an entire left-right region of the airbag when inflation is completed,
    the conduit portion is in a state of non-contact with the front windshield when inflation of the airbag is completed, and
    the conduit portion is disposed in such a way as to approximately follow an upper face of the instrument panel and to be in contact with the upper face of the instrument panel over approximately a whole face on a lower face side of the conduit portion when inflation of the airbag is completed.

2. The passenger seat airbag device according to claim 1, wherein
    the main body inflation portion includes a knee protecting portion configured and adapted to be disposed in front of a knee of the occupant on a lower side when inflation is completed.

3. The passenger seat airbag device according to claim 2, wherein
    the main body inflation portion includes an upper body protecting portion, which is disposed on an upper side when inflation is completed and is configured and adapted to protect an upper body of the occupant, and the knee protecting portion, and
    the knee protecting portion is such that a width dimension between left-right direction sides when inflation is completed is set to be greater than a width dimension between left-right direction sides of the upper body protecting portion.

4. The passenger seat airbag device according to claim 2, wherein
    the main body inflation portion is such that a rear face side when inflation is completed is configured as an occupant protecting face that can receive the occupant who moves forward when a vehicle is in a head-on collision, and
    a protruding inflation portion that inflates in such a way as to protrude rearward from the occupant protecting face is formed in a vicinity of an end portion on a central side in a vehicle width direction of the inflated main body inflation portion.

5. The passenger seat airbag device according to claim 1, wherein
    the main body inflation portion is such that a rear face side when inflation is completed is configured as an occupant protecting face that can receive the occupant who moves forward when a vehicle is in a head-on collision, and
    a protruding inflation portion that inflates in such a way as to protrude rearward from the occupant protecting face is formed in a vicinity of an end portion on a central side in a vehicle width direction of the inflated main body inflation portion.

6. A passenger seat airbag device disposed on an upper face side of an instrument panel in front of a passenger seat, comprising:
    an inflator;
    an airbag that can inflate owing to an inflating gas being caused to flow into an interior, the airbag being configured such that when the airbag inflates owing to an inflating gas discharged from the inflator being caused to flow into the interior; and
    a housing region in which the folded airbag and the inflator are housed, wherein the airbag inflates in such a way as to expand toward a rear while protruding upward from a protrusion aperture formed in the housing region;

the airbag includes a conduit portion that is connected to the inflator on a front end side and is disposed in such a way as to extend approximately following a front-rear direction when inflation is completed, a main body inflation portion that is configured in such a way as to swell up and down and from left to right from a rear end side of the conduit portion, is disposed to a rear side of the instrument panel when inflation is completed, and can protect an occupant seated in the passenger seat, and at least one up-down tether disposed inside the conduit portion, the at least one up-down tether is configured to regulate a thickness of the conduit portion when inflation of the airbag is completed, the main body inflation portion is configured in such a way that an upper end side when inflation is completed is supported by coming into contact with a front windshield disposed above the instrument panel, and a lower front face side is supported by a rear face of the instrument panel when receiving an occupant when inflation is completed, the upper end side is adapted to come into contact with the front windshield over approximately an entire left-right region of the airbag when inflation is completed, the conduit portion is in a state of non-contact with the front windshield when inflation of the airbag is completed, the conduit portion is disposed in such a way as to approximately follow an upper face of the instrument panel and to be in contact with the upper face of the instrument panel over approximately a whole face on a lower face side of the conduit portion when inflation of the airbag is completed, and the at least one up-down tether expands from a front end side of the at least one up-down tether toward a rear end side of the at least one up-down tether, the front end side of the at least one up-down tether being narrower than the rear end side of the at least one up-down tether.

* * * * *